US012316577B2

(12) United States Patent
Liu et al.

(10) Patent No.: US 12,316,577 B2
(45) Date of Patent: May 27, 2025

(54) METHOD FOR CONFIGURING TRANSMIT PORT OF DOWNLINK REFERENCE SIGNAL AND COMMUNICATION APPARATUS

(71) Applicant: HUAWEI TECHNOLOGIES CO., LTD., Guangdong (CN)

(72) Inventors: Yong Liu, Shanghai (CN); Shibin Ge, Shanghai (CN); Huangping Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 381 days.

(21) Appl. No.: 17/730,905

(22) Filed: Apr. 27, 2022

(65) Prior Publication Data

US 2022/0271900 A1    Aug. 25, 2022

Related U.S. Application Data

(63) Continuation of application No. PCT/CN2019/114901, filed on Oct. 31, 2019.

(51) Int. Cl.
*H04L 5/00* (2006.01)

(52) U.S. Cl.
CPC .......... *H04L 5/0078* (2013.01); *H04L 5/0051* (2013.01); *H04L 5/0094* (2013.01)

(58) Field of Classification Search
CPC .. H04B 7/0456; H04B 7/0479; H04B 7/0626; H04B 7/0897; H04B 7/10; H04L 5/0048; H04L 5/0094
USPC ......................................... 370/252, 277, 329
See application file for complete search history.

(56) References Cited

U.S. PATENT DOCUMENTS

2022/0029676 A1\* 1/2022 Ramireddy .......... H04B 7/0626
2022/0416862 A1\* 12/2022 Long ........................ H04B 7/10

FOREIGN PATENT DOCUMENTS

| CN | 108111272 A | 6/2018 |
| CN | 109379172 A | 2/2019 |
| EP | 3515107 A1 | 7/2019 |
| EP | 3562081 A1 | 10/2019 |
| WO | 2019029378 A1 | 2/2019 |
| WO | 2019135650 A1 | 7/2019 |

OTHER PUBLICATIONS

PCT International Search Report and Written Opinion issued in International Application No. PCT/CN2019/114901 on Jun. 8, 2020, 17 pages (with English translation).
Extended European Search Report issued in European Application No. 19950793.0 on Sep. 19, 2022, 13 pages.

\* cited by examiner

Primary Examiner — Harun Chowdhury
(74) Attorney, Agent, or Firm — Fish & Richardson P.C.

(57) ABSTRACT

Example methods and apparatus for configuring a transmit port of a downlink reference signal are described. One example method includes indicating configurations corresponding to a plurality of transmit ports to a terminal device by a network device by using first indication information. Each transmit port may be associated with one piece of delay information, transmit ports associated with same delay information correspond to a same configuration, and at least two transmit ports associated with different delay information correspond to different configurations. The terminal device may receive, based on a configuration corresponding to each transmit port, downlink reference signals sent by the plurality of transmit ports.

20 Claims, 7 Drawing Sheets

METHOD FOR CONFIGURING TRANSMIT PORT OF DOWNLINK REFERENCE SIGNAL AND COMMUNICATION APPARATUS

CROSS-REFERENCE TO RELATED APPLICATIONS

This application is a continuation of International Application No. PCT/CN2019/114901, filed on Oct. 31, 2019. The disclosures of the aforementioned application is hereby incorporated by reference in its entirety.

TECHNICAL FIELD

This application relates to the wireless communication field, and more specifically, to a method for configuring a transmit port of a downlink reference signal and a communication apparatus.

BACKGROUND

In a massive multiple-input multiple-output (Massive MIMO) technology, a network device may reduce interference between a plurality of users and interference between a plurality of signal streams of a same user through precoding. This helps improve signal quality, implement spatial multiplexing, and improve spectrum utilization.

For example, a terminal device may determine a precoding matrix based on downlink channel measurement, and expects to enable, through feedback, the network device to obtain a precoding matrix that is the same as or similar to the precoding matrix determined by the terminal device. Specifically, the terminal device may indicate, for example, to construct a precoding matrix by feeding back one or more spatial domain vectors, one or more frequency domain vectors, and one or more weighting coefficients. However, such a feedback mode causes relatively high feedback overheads.

In some communication technologies, such as a frequency division duplexing (FDD) technology, there is partial reciprocity between uplink and downlink channels. The network device may obtain reciprocity information, such as a delay and an angle, of the downlink channel by estimating the uplink channel. The network device may precode a downlink reference signal based on the delay and the angle, and then send the downlink reference signal, to reduce feedback overheads of the terminal device. However, how to properly configure a transmit port of the downlink reference signal is a technical problem that needs to be resolved urgently.

SUMMARY

This application provides a method for configuring a transmit port of a downlink reference signal and a communication apparatus to properly configure a transmit port of a downlink reference signal.

According to a first aspect, a method for configuring a transmit port of a downlink reference signal is provided. The method may be performed by a terminal device, or may be performed by a component (such as a chip or a chip system) configured in a terminal device.

Specifically, the method includes: receiving first indication information from a network device, where the first indication information is used to indicate configurations corresponding to a plurality of transmit ports; and each of the plurality of transmit ports is associated with one piece of delay information, transmit ports associated with same delay information correspond to a same configuration, and at least two transmit ports associated with different delay information correspond to different configurations; and receiving, based on the configurations, downlink reference signals sent by the plurality of transmit ports, and performing channel estimation.

Based on the foregoing technical solution, the network device may provide different configurations for various transmit ports of the downlink reference signals based on different delay information. Delay information can reflect a change status of a channel in frequency domain. For example, a large delay indicates a sharp change of the channel in frequency domain, and a small delay indicates a flat change of the channel in frequency domain. Therefore, the network device may select a proper configuration for each transmit port based on the change status of the channel in frequency domain. This facilitates channel estimation performed by the terminal device based on the proper configuration, to obtain an accurate channel estimation value.

With reference to the first aspect, in some possible implementations of the first aspect, the configuration includes at least one of the following: a precoding resource bundling granularity, a subband size, and a pilot density.

That is, the network device may configure one or more of the precoding resource bundling granularity, the subband size, and the pilot granularity for each transmit port of the downlink reference signal. The network device may configure different precoding resource bundling granularities, subband sizes, or pilot densities for different transmit ports based on different delay information.

The precoding resource bundling granularity may refer to a quantity of resource blocks (RBs) using a same precoder, for example but not limited to, a quantity of RBs using a same delay vector element or with a same phase rotation angle when precoding is performed based on one delay vector. The precoding resource bundling granularity may also be referred to as a granularity of a precoding resource block group (PRG).

The subband size may be specifically a quantity of RBs included in a subband corresponding to a transmit port. In an implementation, the subband size may be the same as the precoding resource bundling granularity.

The pilot density may be specifically a quantity of REs occupied by each port in a specified resource unit (such as a PRB) or an average quantity of REs occupied by a plurality of ports in a specified resource unit.

With reference to the first aspect, in some possible implementations of the first aspect, when the configuration is the pilot density and the pilot density is less than 1, the method further includes: receiving second indication information, where the second indication information is used to indicate a physical resource block (PRB) to which a downlink reference signal is mapped.

The terminal device may determine, based on the second indication information, a physical resource block configured to carry a reference signal, further receive a reference signal on the physical resource block, and perform channel estimation.

It should be understood that the first indication information and the second indication information may be carried in same signaling, or may be carried in different signaling. This is not limited in this application.

According to a second aspect, a method for configuring a transmit port of a downlink reference signal is provided. The method may be, for example, performed by a network device, or may be performed by a component (such as a chip or a chip system) configured in a network device.

Specifically, the method includes: generating first indication information, where the first indication information is used to indicate configurations corresponding to a plurality of transmit ports; and each of the plurality of transmit ports is associated with one piece of delay information, transmit ports associated with same delay information correspond to a same configuration, and at least two transmit ports associated with different delay information correspond to different configurations; and sending the first indication information to a terminal device.

Based on the foregoing technical solution, the network device may provide different configurations for various transmit ports of the downlink reference signals based on different delay information. Delay information can reflect a change status of a channel in frequency domain. For example, a large delay indicates a sharp change of the channel in frequency domain, and a small delay indicates a flat change of the channel in frequency domain. Therefore, the network device may select a proper configuration for each transmit port based on the change status of the channel in frequency domain. This facilitates channel estimation performed by the terminal device based on the proper configuration, to obtain an accurate channel estimation value.

With reference to the second aspect, in some possible implementations of the second aspect, the configuration includes at least one of the following: a precoding resource bundling granularity, a subband size, and a pilot density.

That is, the network device may configure one or more of the precoding resource bundling granularity, the subband size, and the pilot granularity for each transmit port of the downlink reference signal. The network device may configure different precoding resource bundling granularities, subband sizes, or pilot densities for different transmit ports based on different delay information.

The precoding resource bundling granularity may refer to a quantity of RBs using a same precoder, for example but not limited to, a quantity of RBs using a same delay vector element or with a same phase rotation angle when precoding is performed based on one delay vector. The precoding resource bundling granularity may also be referred to as a granularity of a precoding resource block group (PRG).

The subband size may be specifically a quantity of RBs included in a subband corresponding to a transmit port. In an implementation, the subband size may be the same as the precoding resource bundling granularity.

The pilot density may be specifically a quantity of REs occupied by each port in a specified resource unit (such as a PRB) or an average quantity of REs occupied by a plurality of ports in a specified resource unit.

With reference to the second aspect, in some possible implementations of the second aspect, when the configuration is the pilot density and the pilot density is less than 1, the method further includes: sending second indication information, where the second indication information is used to indicate a physical resource block to which a downlink reference signal is mapped.

The terminal device may determine, based on the second indication information, a physical resource block configured to carry a reference signal, further receive a reference signal on the physical resource block, and perform channel estimation.

It should be understood that the first indication information and the second indication information may be carried in same signaling, or may be carried in different signaling. This is not limited in this application.

With reference to the first aspect or the second aspect, in some implementations, that at least two transmit ports associated with different angle-delay pair information correspond to different configurations includes: when the configuration is the precoding resource bundling granularity, a transmit port with a larger delay value corresponds to a smaller precoding resource bundling granularity; when the configuration is the subband size, a transmit port with a larger delay value corresponds to a smaller subband size; or when the configuration is the pilot density, a transmit port with a larger delay value corresponds to a larger pilot density.

Correspondingly, when the configuration is the precoding resource bundling granularity, a transmit port with a smaller delay value corresponds to a larger precoding resource bundling granularity; when the configuration is the subband size, a transmit port with a smaller delay value corresponds to a larger subband size; or when the configuration is the pilot density, a transmit port with a smaller delay value corresponds to a smaller pilot density.

From the perspective of channel estimation, a larger PRG granularity indicates higher channel estimation accuracy. However, when the PRG granularity increases to a value, the channel estimation accuracy may converge. Therefore, an accuracy gain of channel estimation brought by an increase of the PRG granularity is related to a channel environment. A more intense change of a channel in frequency domain indicates a smaller channel estimation interpolation loss. In this case, the increase of the PRG granularity facilitates a limited accuracy gain of channel estimation.

Therefore, in this embodiment of this application, a larger delay value indicates a more intense change of a channel precoded based on the delay in frequency domain. For example, there is large phase rotation between two neighboring RBs. Bundling a plurality of RBs together for channel estimation brings a limited accuracy gain of channel estimation. Therefore, it is not necessary to bind the plurality of RBs together for channel estimation. Therefore, the precoding resource bundling granularity may be set to a small value, and the corresponding subband size may also be set to a small value. Alternatively, the pilot density may be set to a large value, so that the terminal device performs channel estimation based on more reference signals. Therefore, a more accurate channel estimation value can be obtained.

On the contrary, a small delay value indicates a flat change of a channel precoded based on the delay in frequency domain. For example, there is a small phase rotation angle between two neighboring RBs, which is even 0. It is suitable to bind a plurality of RBs together for channel estimation, and a channel estimation value obtained by bundling the plurality of RBs together for channel estimation is more accurate. Therefore, the precoding resource bundling granularity may be set to a large value, and the corresponding subband size may also be set to a large value. Alternatively, because the change of the channel in frequency domain is flat, it is not necessary to set a high pilot density. Therefore, the pilot density may be set to a small value to reduce pilot overheads.

The subband size is defined as a subband size corresponding to a transmit port, and the subband size may be the same as the PRG granularity. Therefore, when indicating the configurations corresponding to the transmit ports by using the first indication information, the network device may implicitly indicate the PRG granularity by using the subband size. In other words, only either of the PRG granularity and the subband size may be indicated.

With reference to the first aspect or the second aspect, in some possible implementations, the delay information includes: a value of a delay; a magnitude relationship between a value of a delay and a predetermined value; or a magnitude relationship between a value of a delay and a value of a reference delay.

If the delay information is defined based on the value of the delay, transmit ports associated with different delays are correspondingly configured. If the delay information is defined based on the magnitude relationship between the delay and the predetermined value or a value of a reference delay, delays may be classified more coarsely based on the magnitude relationship to correspondingly configure transmit ports associated with different delay information. In general, if a precoding resource bundling granularity, a subband size, or a pilot density is configured for a transmit port based on delay information, the transmit port may be properly configured based on different channel change statuses (which, for example, may be intense or flat).

With reference to the first aspect or the second aspect, in some possible implementations, transmit ports corresponding to a same configuration belong to a same transmit port group, and one transmit port group includes one or more transmit ports.

To reduce signaling overheads, a port group may further be defined, so that transmit ports with a same configuration indicate a configuration corresponding to each transmit port in the group by indicating a configuration corresponding to the port group.

With reference to the first aspect or the second aspect, in some possible implementations, the first indication information is carried in at least one of the following: a radio resource control (RRC) message, a medium access control (MAC)-control element (CE), and downlink control information (DCI).

It should be understood that the signaling listed above is merely examples, and shall not constitute any limitation on this application. Specific signaling used to carry the first indication information is not limited in this application.

According to a third aspect, a communication apparatus is provided. The communication apparatus includes modules or units configured to perform the method in any possible implementation of the first aspect.

According to a fourth aspect, a communication apparatus is provided. The communication apparatus includes a processor. The processor is coupled to a memory, and may be configured to execute instructions in the memory, to implement the method according to any one of the possible implementations of the first aspect. Optionally, the communication apparatus further includes the memory. Optionally, the communication apparatus further includes a communication interface, and the processor is coupled to the communication interface.

In an implementation, the communication apparatus is a terminal device. When the communication apparatus is a terminal device, the communication interface may be a transceiver or an input/output interface.

In another implementation, the communication apparatus is a chip or a chip system configured in a terminal device. When the communication apparatus is a chip or a chip system configured in a terminal device, the communication interface may be an input/output interface.

Optionally, the transceiver may be a transceiver circuit. Optionally, the input/output interface may be an input/output circuit.

According to a fifth aspect, a communication apparatus is provided. The communication apparatus includes modules or units configured to perform the method in any possible implementation of the second aspect.

According to a sixth aspect, a communication apparatus is provided. The communication apparatus includes a processor. The processor is coupled to a memory, and may be configured to execute an instruction in the memory, to implement the method according to any one of the possible implementations of the second aspect. Optionally, the communication apparatus further includes the memory. Optionally, the communication apparatus further includes a communication interface, and the processor is coupled to the communication interface.

In an implementation, the communication apparatus is a network device. When the communication apparatus is the network device, the communication interface may be a transceiver or an input/output interface.

In another implementation, the communication apparatus is a chip or a chip system configured in a network device. When the communication apparatus is a chip or a chip system configured in a network device, the communication interface may be an input/output interface.

Optionally, the transceiver may be a transceiver circuit. Optionally, the input/output interface may be an input/output circuit.

According to a seventh aspect, a processor is provided. The processor includes an input circuit, an output circuit, and a processing circuit. The processing circuit is configured to receive a signal by using the input circuit and transmit a signal by using the output circuit, so that the processor performs the method in any possible implementation of the first aspect or the second aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in the embodiments of this application.

According to an eighth aspect, a processing apparatus is provided. The apparatus includes a processor and a memory. The processor is configured to: read instructions stored in the memory, receive a signal via a receiver, transmit a signal via a transmitter, and perform the method according to any possible implementation of the first aspect and the second aspect.

Optionally, there are one or more processors, and there are one or more memories.

Optionally, the memory may be integrated with the processor, or the memory and the processor are separately disposed.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in the embodiments of this application.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus in the eighth aspect may be one or more chips. The processor in the processing apparatus may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to a ninth aspect, a computer program product is provided. The computer program product includes a computer program (which may also be referred to as code or instructions). When the computer program is run, a computer is enabled to perform the method according to any one of the possible implementations in the first aspect and the second aspect.

According to a tenth aspect, a computer-readable medium is provided. The computer-readable medium stores a computer program (which may also be referred to as code or instructions). When the computer program is run on a computer, the computer is enabled to perform the method according to any one of the possible implementations in the first aspect and the second aspect.

According to an eleventh aspect, a communication system is provided. The communication system includes the foregoing network device and terminal device.

DESCRIPTION OF EMBODIMENTS

Figure 1:
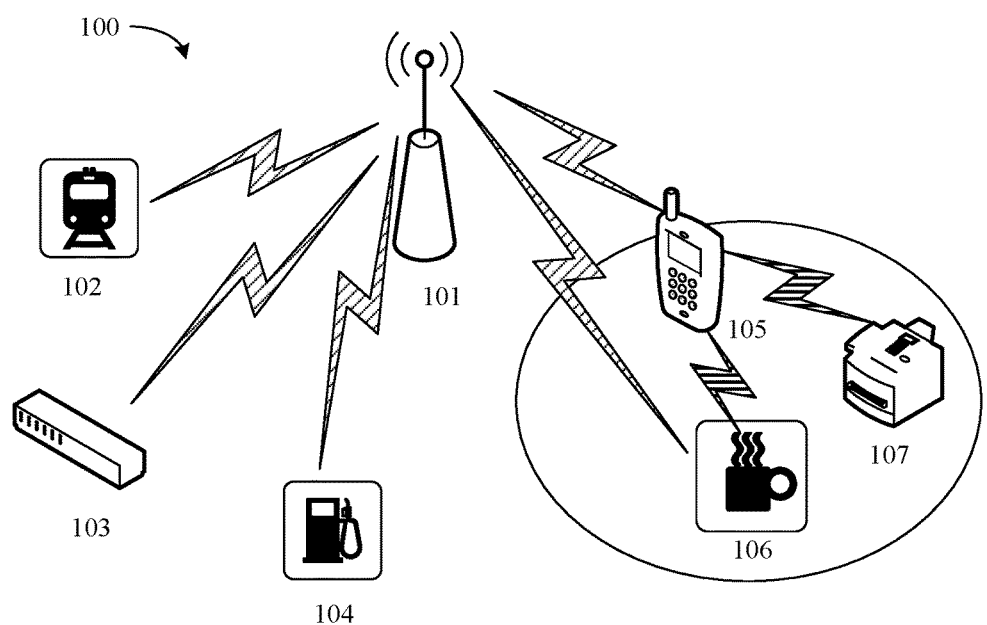
FIG. 1 is a schematic diagram of an architecture of a communication system to which a method for configuring a transmit port of a downlink reference signal is applicable according to an embodiment of this application.

The following describes technical solutions of this application with reference to the accompanying drawings.

The technical solutions in the embodiments of this application may be applied to various communication systems, for example, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future fifth generation (5th Generation, 5G) mobile communication system, or a new radio access technology (NR). The 5G mobile communication system may include non-standalone (NSA) and/or standalone (SA).

The technical solutions provided in this application may further be applied to machine type communication (MTC), a long term evolution-machine (LTE-M) technology, a device to device (D2D) network, a machine to machine (M2M) network, an internet of things (IoT) network, or another network. The IoT network may include, for example, the internet of vehicles. A communication manner in an internet of vehicles system is collectively referred to as vehicle to another device (vehicle to X, V2X, where X can stand for anything). For example, the V2X may include vehicle to vehicle (V2V) communication, vehicle to infrastructure (V2I) communication, vehicle to pedestrian (V2P) communication, or vehicle to network (V2N) communication.

The technical solutions provided in this application may be further applied to a future communication system, for example, a sixth generation (6th Generation, 6G) mobile communication system. This is not limited in this application.

In the embodiments of this application, a network device may be any device having a wireless transceiver function. The device includes, but is not limited to: an evolved NodeB (eNB), a radio network controller (RNC), a NodeB (NB), a base station controller (BSC), a base transceiver station (BTS), a home base station (for example, a home evolved NodeB, a home NodeB, or an HNB), a baseband unit (BBU), an access point (AP) in a wireless fidelity (Wi-Fi) system, a wireless relay node, a wireless backhaul node, a transmission point (TP), a transmission and reception point (TRP), or the like; may be a gNB or a transmission point (TRP or TP) in a 5G system such as an NR system, one or one group (including a plurality of antenna panels) of antenna panels of a base station in a 5G system; or may be a network node constructing a gNB or a transmission point, for example, a baseband unit (BBU) or a distributed unit (DU), or a base station in a next generation 6G communication system.

In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and a non-real-time service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer eventually becomes information at the PHY layer, or is changed from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or may be classified into a network device in a core network (CN). This is not limited in this application.

The network device provides a cell with a service, and the terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells are characterized by small coverage and low transmit power, and are applicable to providing a high-rate data transmission service.

In the embodiments of this application, the terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus.

The terminal device may be a device that provides voice/data connectivity for a user, for example, a handheld device or a vehicle-mounted device that has a wireless connection function. Currently, some examples of terminals may be: a mobile phone, a tablet computer (pad), a computer with a wireless transceiver function (for example, a notebook computer or a laptop computer), a mobile internet device (MID), a virtual reality (VR) device, an augmented reality (AR) device, a wireless terminal in industrial control, a wireless terminal in self driving (self-driving), a wireless terminal in telemedicine (remote medical), a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal device in a 5G network, and a terminal device in a future evolved public land mobile network (PLMN).

The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that can be directly worn on a body or integrated into clothes or an accessory of a user. The wearable device is not only a hardware device, but is used to implement a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device may alternatively be a terminal device in an internet of things (IoT) system. IoT is an important part in development of future information technologies. A main technical feature of IoT is to connect an object to a network by using a communication technology, to implement an intelligent network for human-machine interconnection and thing-thing interconnection. The IoT technology can be used to achieve massive connectivity, deep coverage, and power-saving terminals by using, for example, a narrow band (NB) technology.

The terminal device may alternatively include sensors such as an intelligent printer, a train detector, or a gas station, and main functions of the terminal device include: collecting data (which is a function of some terminal devices), receiving control information and downlink data of a network device, sending an electromagnetic wave, and transmitting uplink data to the network device.

For ease of understanding the embodiments of this application, a communication system to which a method according to an embodiment of this application is applicable is first described in detail with reference to FIG. 1. FIG. 1 is a schematic diagram of a communication system 100 to which a method according to an embodiment of this application is applicable. As shown in the figure, the communication system 100 may include at least one network device, for example, a network device 101 in a 5G system shown in FIG. 1. The communication system 100 may further include at least one terminal device, for example, terminal devices 102 to 107 shown in FIG. 1. The terminal devices 102 to 107 may be mobile or fastened. The network device 101 may communicate with one or more of the terminal devices 102 to 107 through a wireless link. Each network device can provide communication coverage for a specific geographic area, and can communicate with a terminal device located within the coverage area. For example, the network device may send configuration information to the terminal device, and the terminal device may send uplink data to the network device based on the configuration information. For another example, the network device may send downlink data to the terminal device. Therefore, the network device 101 and the terminal devices 102 to 107 in FIG. 1 form a communication system.

Optionally, terminal devices may directly communicate with each other. For example, the terminal devices may directly communicate with each other by using a D2D technology and the like. As shown in the figure, the terminal device 105 may directly communicate with the terminal device 106 and the terminal device 107 by using the D2D technology. The terminal device 106 and the terminal device 107 may separately or simultaneously communicate with the terminal device 105.

The terminal devices 105 to 107 may separately communicate with the network device 101. For example, the terminal devices 105 to 107 may directly communicate with the network device 101. For example, the terminal devices 105 and 106 in the figure may directly communicate with the network device 101. Alternatively, the terminal devices 105 to 107 may indirectly communicate with the network device 101. For example, the terminal device 107 communicates with the network device 101 through the terminal device 106.

It should be understood that FIG. 1 shows examples of one network device, a plurality of terminal devices, and communication links between the communication devices. Optionally, the communication system 100 may include a plurality of network devices, and there may be another quantity of terminal devices within a coverage range of each network device, for example, more or fewer terminal devices. This is not limited in this application.

For the foregoing communication devices, such as the network device 101 and the terminal devices 102 to 107 in FIG. 1, a plurality of antennas may be configured. The plurality of antennas may include at least one transmit antenna configured to send a signal and at least one receive antenna configured to receive a signal. In addition, the communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device and the terminal device may communicate with each other by using a multi-antenna technology.

Optionally, the wireless communication system 100 may further include another network entity such as a network controller or a mobility management entity. This is not limited in the embodiments of this application.

For ease of understanding of the embodiments of this application, the following briefly describes a process of processing a downlink signal at a physical layer before the downlink signal is sent. It should be understood that a processing process for a downlink signal described below may be performed by a network device, or may be performed by a component (such as a chip or a chip system) configured in a network device. For ease of description, the network device and the chip are collectively referred to as a network device below.

The network device may process a codeword on a physical channel. The codeword may be a coded bit obtained through coding (for example, including channel coding). The codeword is scrambled (scrambling) to generate a scrambling bit. Modulation mapping is performed on the scrambling bit, to obtain a modulation symbol. The modulation symbol is mapped to a plurality of layers (layer) through layer mapping. The layer is also referred to as a transport layer. A modulation symbol obtained through the layer mapping is precoded (precoding), to obtain a precoded signal. The precoded signal is mapped to a plurality of resource elements (resource element, RE) through RE mapping. These REs are then transmitted through an antenna port after orthogonal multiplexing (orthogonal frequency division multiplexing, OFDM) modulation is performed on the REs.

It should be understood that the process of processing the downlink signal described above is merely an example for description, and shall not constitute any limitation on this application. For a specific process of processing the downlink signal, refer to the conventional technology. For brevity, detailed descriptions of the specific process are omitted herein.

For ease of understanding the embodiments of this application, terms used in the embodiments of this application are briefly described.

1. Precoding technology: When a channel state is known, the network device may process a to-be-sent signal by using a precoding matrix that matches the channel state, so that a precoded to-be-sent signal adapts to a channel, thereby reducing complexity of eliminating inter-channel impact by a receiving device. Therefore, after the to-be-sent signal is precoded, signal receiving quality (for example, a signal to interference plus noise ratio (SINR)) is improved. Therefore, transmission between a transmit device and a plurality of receive devices can be implemented on a same time-frequency resource by using the precoding technology. That is, multi-user multiple-input multiple-output (multiple user multiple input multiple output, MU-MIMO) is implemented.

It should be understood that related descriptions of the precoding technology in this specification are merely examples for ease of understanding, and are not intended to limit the protection scope of the embodiments of this application. In a specific implementation process, the sending device may further perform precoding in another manner. For example, when channel information (for example, but not limited to, a channel matrix) cannot be obtained, precoding is performed by using a preset precoding matrix or in a weighting processing manner. For brevity, specific content thereof is not described in the specification.

2. Channel reciprocity: In some communication modes, such as TDD, uplink and downlink channels transmit signals on a same frequency domain resource and different time domain resources. Within relatively short time (for example, channel propagation coherence time), it may be considered that signals on the uplink and downlink channels experience same channel fading. This is reciprocity between the uplink and downlink channels. Based on the reciprocity between the uplink and downlink channels, the network device may measure the uplink channel based on an uplink reference signal, for example, a sounding reference signal (SRS). In addition, the downlink channel may be estimated based on the uplink channel, so that a precoding matrix used for downlink transmission can be determined.

However, in some other communication modes, such as FDD, uplink and downlink channels do not have complete reciprocity because a band spacing of the uplink and downlink channels is much larger than a coherent bandwidth. A precoding matrix used for downlink transmission and determined by using the uplink channel may not be adaptable to the downlink channel. However, in the FDD mode, the uplink and downlink channels still have partial reciprocity, for example, angle reciprocity and delay reciprocity. Therefore, an angle and a delay may also be referred to as reciprocity parameters.

When a signal is transmitted over a radio channel, the signal may arrive at a receive antenna from a transmit antenna through a plurality of paths. A multipath delay causes frequency selective fading, that is, a change on a frequency domain channel. A delay is transmission time of a radio signal on different transmission paths, is determined by a distance and a speed, and is irrelevant to a frequency domain of the radio signal. When a signal is transmitted on different transmission paths, there are different transmission delays due to different distances. Because physical locations of a network device and a terminal device are fixed, multipath distributions of the uplink and downlink channels are the same in terms of delay. Therefore, delays on the uplink and downlink channels in the FDD mode may be considered to be the same, in other words, reciprocal.

In addition, an angle may be an angle of arrival (AOA) at which a signal arrives at a receive antenna through a radio channel, or may be an angle of departure (AOD) at which a signal is transmitted by using a transmit antenna. In the embodiments of this application, the angle may be an angle of arrival at which an uplink signal arrives at the network device, or may be an angle of departure at which the network device transmits a downlink signal. Because of reciprocity of transmission paths of the uplink and downlink channels at different frequencies, an angle of arrival of an uplink reference signal and an angle of departure of a downlink reference signal may be considered to be reciprocal.

In the embodiments of this application, each angle may be represented by using one angle vector, and each delay may be represented by using one delay vector. Therefore, in the embodiments of this application, one angle vector may represent one angle, and one delay vector may represent one delay.

3. Reference signal (RS) and precoded reference signal: The reference signal may also be referred to as a pilot, a reference sequence, or the like. In the embodiments of this application, the reference signal may be a reference signal used for channel measurement. For example, the reference signal may be a channel state information reference signal (CSI-RS) used for downlink channel measurement, or may be an SRS used for uplink channel measurement. It should be understood that the reference signals listed above are merely examples, and shall not constitute any limitation on this application. This application does not exclude a possibility that another reference signal is defined in a future protocol to implement a same or similar function.

The precoded reference signal may be a reference signal obtained by precoding the reference signal. The precoding may specifically include beamforming and/or phase rotation. Beamforming may be implemented, for example, by precoding a downlink reference signal based on one or more angle vectors, and phase rotation may be implemented, for example, by precoding a downlink reference signal based on one or more delay vectors.

In the embodiments of this application, for ease of distinguishing and description, a reference signal obtained through precoding, for example, beamforming and/or phase rotation, is referred to as a precoded reference signal; and a reference signal that is not precoded is referred to as a reference signal for short.

In the embodiments of this application, precoding the downlink reference signal based on the one or more angle vectors may also be referred to as loading the one or more angle vectors to the downlink reference signal to implement beamforming; and precoding the downlink reference signal based on the one or more delay vectors may also be referred to as loading the one or more delay vectors to the downlink reference signal to implement phase rotation.

4. Port: The port may include a transmit port (or referred to as a send port) and a receive port.

The transmit port may be understood as a virtual antenna that is identified by a receiving device.

Optionally, the transmit port is a port obtained after beamforming and phase rotation. For example, a reference signal of each transmit port may be a precoded reference signal obtained by precoding a reference signal based on an angle vector and a delay vector. The transmit port may also be referred to as a port of the precoded reference signal.

A reference signal of each transmit port may be transmitted by using one or more frequency domain units.

The receive port may be understood as a receive antenna of a receiving device. For example, in downlink transmission, a receive port may be a receive antenna of a terminal device.

5. Angle vector: The angle vector may be understood as a precoding vector used to perform beamforming on a reference signal. The reference signal transmitted by the sending device may have spatial directivity through beamforming. Therefore, a process of precoding a reference signal based on an angle vector may also be considered as a space domain (or space domain for short) precoding process. Therefore, the angle vector may also be referred to as a spatial domain vector, a beam vector, or the like.

A quantity of ports of a precoded reference signal obtained by precoding a reference signal based on one or more angle vectors is the same as a quantity of angle vectors. When a quantity K of angle vectors is less than a quantity T of transmit antenna ports in a polarization direction, dimension reduction of antenna ports may be implemented through spatial domain precoding, thereby reducing pilot overheads. $K \geq 1$, $T \geq 1$, and both K and T are integers.

The angle vector may be a vector having a length of T.

Optionally, the angle vector is a discrete Fourier transform (DFT) vector. The DFT vector may be a vector in a DFT matrix.

Optionally, the angle vector is a conjugate transpose vector of a DFT vector. The DFT conjugate transpose vector may be a column vector in a conjugate transpose matrix of a DFT matrix.

Optionally, the angle vector is an oversampling DFT vector. The oversampling DFT vector may be a vector in an oversampling DFT matrix.

In a possible design, the angle vector may be, for example, a two-dimensional (2 dimensions, 2D)-DFT vector $v_{l,m}$ defined in a type II codebook in the NR protocol TS 38.214 release 15 (R15). In other words, the angle vector may be a 2D-DFT vector or an oversampling 2D-DFT vector.

The following shows an example of the 2D-DFT vector:

$$v_{i_1,i_2} = \left[ u_{i_2} \quad e^{j\frac{2\pi i_1}{O_1 I_1}} u_{i_2} \quad \ldots \quad e^{j\frac{2\pi i_1 (I_1-1)}{O_1 I_1}} u_{i_2} \right]^T$$

$$u_{i_2} = \begin{cases} \left[ 1 \quad e^{j\frac{2\pi i_2}{O_2 I_2}} \quad \ldots \quad e^{j\frac{2\pi i_2 (I_2-1)}{O_2 I_2}} \right] & I_2 > 1 \\ 1 & I_2 = 1 \end{cases}$$

$I_1$ is a quantity of antenna ports in a same polarization direction that are included in each column (or row) in an antenna array, and $I_2$ is a quantity of antenna ports in a same polarization direction that are included in each row (or column) in the antenna array. In this embodiment, $T=I_1 \times I_2$. $O_1$ and $O_2$ are oversampling factors. $i_1$ and $i_2$ satisfy: $0 \leq i_1 \leq (O_1 \times I_1 - 1)$, and $0 \leq i_2 \leq (O_2 \times I_2 - 1)$.

Optionally, the angle vector is a steering vector of a uniform linear array (ULA), for example, $$a(\theta_k) = \begin{bmatrix} 1 \\ e^{\frac{j2\pi}{\lambda} \cos\theta_k d} \\ \vdots \\ e^{\frac{j2\pi}{\lambda} \cos\theta_k (T-1)d} \end{bmatrix}.$$

$\theta_k$ is an angle, and $k=1, 2, \ldots,$ or K. K represents a quantity of angle vectors, $\lambda$ is a wavelength, and d is an antenna spacing.

The steering vector may indicate a phase difference between responses of angles of arrival of a path on different antennas. The steering vector $a(\theta_k)$ and the vector $V_{i_1,i_2}$ in the DFT matrix satisfy:

$$\cos\theta_k d = \frac{i_1}{O_1 I_1}.$$

Optionally, the angle vector is a steering vector of a uniform plane array (UPA). The steering vector may be, for example, a steering vector that includes information about a horizontal angle and a pitch angle, for example, $$a(\theta_k, \varphi_k) = \begin{bmatrix} e^{\frac{j2\pi}{\lambda} u_k \rho_1} \\ e^{\frac{j2\pi}{\lambda} u_k \rho_2} \\ \vdots \\ e^{\frac{j2\pi}{\lambda} u_k \rho_T} \end{bmatrix}.$$

$\theta_k$ is the horizontal angle, and $\varphi_k$ is the pitch angle. $\rho_t$ is a three-dimensional coordinate of a $t^{th}$ transmit antenna port, and t=1, 2, . . . , or T. $u_k$ is a unit sphere basis vector corresponding to a $k^{th}$ angle: $u_k$=[sin $\varphi_k$ cos $\varphi_k$ sin $\varphi_k$ sin $\varphi_k$ cos $\varphi_k$].

For ease of description, the angle vector is denoted as $a(\theta_k)$ below.

In downlink transmission, because a reference signal loaded with an angle vector may be transmitted to a terminal device through a downlink channel, a channel sounded by the terminal device based on the received precoded reference signal is equivalent to a channel loaded with the angle vector. For example, the angle vector $a(\theta_k)$ being loaded to a downlink channel V may be expressed as $Va(\theta_k)$.

It is assumed that a single-polarized antenna is configured for a sending device, a quantity of transmit antenna ports is T, and a quantity of frequency domain units is N, where N≥1 and N is an integer. For one receive port of a receiving device, a channel estimated based on a received reference signal may be a matrix with a dimension of N×T. If space domain precoding is performed on a reference signal based on one angle vector, the angle vector may be loaded to the reference signal. Because a dimension of the angle vector is T×1, for a receive port of the receiving device, a dimension of the channel estimated based on the precoded reference signal may be N×1. In addition, on each receive port and each frequency domain unit, a dimension of a channel estimated by the terminal device based on the received precoded reference signal may be 1×1.

It should be understood that the angle vector is a form that is proposed in this application and that is used to represent an angle. The angle vector is named only for ease of distinguishing from the delay, and shall not constitute any limitation on this application. This application does not exclude a possibility of defining another name in a future protocol to represent a same or similar meaning.

6. Delay vector: The delay vector may also be referred to as a frequency domain vector. The delay vector may be a vector used to indicate a change rule of a channel in frequency domain. As described above, a multipath delay causes frequency selective fading. It can be learned from Fourier transform that a time delay of a signal in time domain may be equivalent to a phase gradient in frequency domain.

For example, for a signal g(t), the signal may be transformed to the frequency domain through the Fourier transform: $F(g(t))=\int_{-\infty}^{+\infty}g(t)e^{j\omega t}dt$; and for a $g(t-t_0)$, the signal may be transformed to the frequency domain through the Fourier transform: $F(g(t-t_0))=\int_{-\infty}^{+\infty}g(t-t_0)e^{j\omega t}dt=e^{j\omega t_0}F(g(t))$. $\omega$ is a frequency variable, different frequencies correspond to different phase rotations, and t and $t-t_0$ indicate delays.

Signals of the two delays may be expressed as $x(t)=g(t)+g(t-t_0)$. A function $X(\omega)=g(\omega)(1+e^{j\omega t_0})$ of a frequency variable may be obtained based on this. Let $g(\omega)=1$, it may be obtained that $X(\omega)=1+e^{j\omega t_0}$. Therefore, signals of two different delays cause frequency-domain selective fading.

Because a phase change of a channel in each frequency domain unit is related to a delay, a change rule of the phase of the channel in each frequency domain unit may be represented by using a delay vector. In other words, the delay vector may be used to represent a delay characteristic of the channel.

That the reference signal is precoded based on the delay vector may essentially mean that phase rotation is performed on each frequency domain unit in frequency domain based on an element in the delay vector, to pre-compensate, by using the precoded reference signal, a frequency selective characteristic caused by the multipath delay. Therefore, a process of precoding the reference signal based on the delay vector may be considered as a frequency domain precoding process.

Precoding a reference signal based on different delay vectors is equivalent to performing phase rotation on each frequency domain unit of a channel based on the different delay vectors. In addition, phase rotation angles of a same frequency domain unit may be different. To distinguish between different delays, the network device may precode a reference signal based on each of L delay vectors.

Optionally, a length of the delay vector is N, N may be a quantity of frequency domain units configured to carry a reference signal (for example, an un-precoded reference signal or a precoded reference signal), N≥1, and N is an integer.

Optionally, an $l^{th}$ delay vector in the L delay vectors may be expressed as $b(\tau_l)$, and $$b(\tau_l) = \begin{bmatrix} e^{-j2\pi f_0 \tau_l} \\ e^{-j2\pi f_1 \tau_l} \\ \vdots \\ e^{-j2\pi f_{N-1} \tau_l} \end{bmatrix},$$

where l=0, 1, . . . , or L−1; L may represent a quantity of delay vectors; and $f_0, f_1, \ldots$, and $f_{N-1}$ respectively represent carrier frequencies of the $0^{th}$, and the $1^{st}$ to an $(N-1)^{th}$ frequency domain units.

Optionally, the delay vector is obtained from a DFT matrix, for example, $$u_k = \begin{bmatrix} 1 & e^{j\frac{2\pi k}{O_f N}} & \ldots & e^{j\frac{2\pi k(N-1)}{O_f N}} \end{bmatrix}^T.$$

Each vector in the DFT matrix may be referred to as a DFT vector.

Herein, $O_f$ is an oversampling factor, and $O_f \geq 1$; and k is a DFT vector index, and satisfies: $0 \leq k \leq O_f \times N-1$ or $1-O_f \times N \leq k \leq 0$.

For example, when k<0, $b(\tau_1)$ and the vector $u_k$ in the DFT matrix may satisfy:

$b(\tau_1)=u_k\beta_1$ and $$\Delta f \tau_l = \frac{k}{O_f N},$$

where $\beta_1 = e^{-j2\pi f_1 \tau_l}, \Delta f = f_n - f_{n+1}$, and $1 \leq n \leq N-1$.

For ease of description, the delay vector is denoted as $b(\tau_l)$ below.

In the embodiments of this application, for ease of understanding, a resource block (RB) is used as an example of a frequency domain unit to describe a specific process of performing frequency domain precoding on a reference signal. When the RB is used as an example of a frequency domain unit, it may be considered that each frequency domain unit includes only one RB (which, for example, may be briefly referred to as a reference signal RB) used to carry a reference signal. Actually, each frequency domain unit may include one or more RBs used to carry a reference signal. When each frequency domain unit includes a plurality of RBs used to carry a reference signal, the network device may load a delay vector to the plurality of RBs used to carry a reference signal in each frequency domain unit.

In downlink transmission, because a reference signal loaded with a delay vector may be transmitted to a terminal device through a downlink channel, a channel sounded by the terminal device based on the received precoded reference signal is equivalent to a channel loaded with the delay vector. In an implementation, if frequency domain precoding is performed on a reference signal based on a delay vector with a length of N, N elements in the delay vector may be respectively loaded to reference signals carried on N resource blocks (resource block, RB). For example, loading an $n^{th}$ element in the delay vector to a channel $V^{(n)}$ on an $n^{th}$ RB may be expressed as $V^{(n)} e^{j2\pi f_n \tau_l}$.

It should be noted that frequency domain precoding may be performed on the reference signal based on the delay vector before or after resource mapping. This is not limited in this application.

For ease of understanding, a process of precoding a reference signal based on the delay vector $b(\tau_l)$ is described in detail below with reference to FIG. 2.

Figure 2:
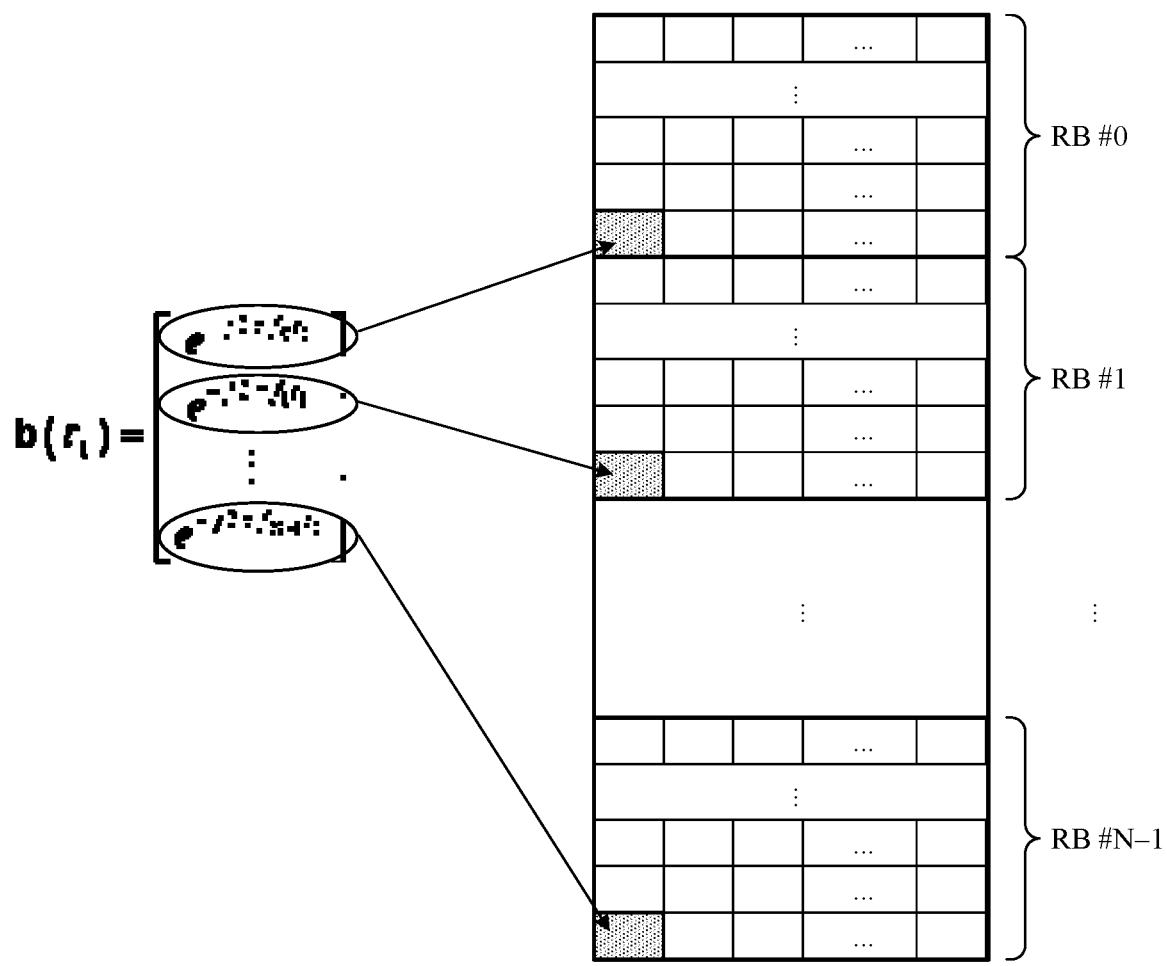
FIG. 2 is a schematic diagram of precoding a reference signal based on a delay vector according to an embodiment of this application.

FIG. 2 shows an example of performing, based on the delay vector $b(\tau_l)$, frequency domain precoding on reference signals carried on N RBs. The N RBs may include an RB #0 and an RB #1 to an RB #N−1. Each of the N RBs includes one or more REs used to carry the reference signal, or a plurality of RBs include one RE used to carry the reference signal. For example, REs used to carry the reference signal may be an RE in the first time domain symbol and the first sub carrier in each RB, as shown by the shaded boxes in the figure. In this case, a time domain vector $b(\tau_l)$ may be loaded to the RE in the first time domain symbol and the first sub carrier in each RB. Reference signals carried on the REs in the first time domain symbol and the first sub carrier in each of the N RBs may be reference signals corresponding to a same port.

It is assumed that the delay vector $$b(\tau_1) = \begin{bmatrix} e^{-j2\pi f_0 \tau_1} \\ e^{-j2\pi f_1 \tau_1} \\ \vdots \\ e^{-j2\pi f_{N-1} \tau_1} \end{bmatrix}.$$

If the delay vector $b(\tau_l)$ is loaded to the N RBs, corresponding phase rotation may be performed on the N RBs. N elements in the delay vector may be in a one-to-one correspondence with the N RBs. For example, a $0^{th}$ element $e^{-j2\pi f_0 \tau_1}$ in the frequency domain vector $b(\tau_1)$ may be loaded to the RB #0, the $1^{st}$ element $e^{-j2\pi f_1 \tau_1}$ in the frequency domain vector $b(\tau_1)$ may be loaded to the RB #1, an $(N-1)^{th}$ element $e^{-j2\pi f_{N-1} \tau_1}$ in the delay vector $b(\tau_1)$ may be loaded to the RB #N−1. By analogy, an $n^{th}$ element $e^{-j2\pi f_n \tau_1}$ in the delay vector $b(\tau_1)$ may be loaded to an RB #n. For brevity, examples are not listed one by one herein.

It should be understood that the delay vector is a form that is proposed in this application and that is used to represent a delay. The delay vector is named merely for ease of distinguishing from the angle, and shall not constitute any limitation on this application. This application does not exclude a possibility of defining another name in a future protocol to represent a same or similar meaning.

In addition, it is assumed that a single-polarized antenna is configured for a network device, a quantity of transmit antenna ports is T, and a quantity of RBs is N. For one receive port of a terminal device, a channel estimated based on a received reference signal may be expressed as a matrix with a dimension of N×T. If frequency domain precoding is performed on the reference signal based on L delay vectors, for one receive port of the terminal device, the channel estimated based on the received precoded reference signal may be expressed as a matrix with a dimension of N×L. In addition, on each receive port and each frequency domain unit, a dimension of a channel estimated by the terminal device based on the received precoded reference signal may be 1×L.

7. Precoding resource block group (PRG): The precoding resource block group may be understood as a precoding frequency domain granularity. One PRG may include one or more RBs. In other words, one or more RBs in frequency domain may use a same precoder.

In the embodiments of this application, a plurality of RBs included in each PRG may use a same delay vector element. In the foregoing listed examples of precoding the reference signal based on the delay vector, elements loaded to a plurality of RBs in a same PRG are the same. For example, if the delay vector b ($\tau_1$) is loaded to N PRGs and each PRG includes four RBs, an element loaded to an $n^{th}$ PRG is $e^{-j2\pi f_n \tau_1}$, where n may be any integer from 0 to N−1.

8. Angle-delay pair: The angle-delay pair may also be referred to as a spatial-frequency vector pair, a spatial-frequency pair, or the like. One angle-delay pair may be a combination of one angle vector and one delay vector. In an implementation, each angle-delay pair may include one angle vector and one delay vector. At least one of angle vectors and delay vectors included in any two angle-delay pairs is different. In other words, each angle-delay pair may be uniquely determined by one angle vector and one delay vector.

In the embodiments of this application, when a reference signal is precoded based on one angle vector $a(\theta_k)$ and one delay vector $b(\tau_1)$, a precoding matrix used to precode the reference signal may be expressed as a product of conjugate transposes of one angle vector and one delay vector, for example, may be expressed as $a(\theta_k) \times b(\tau_1)^H$. A dimension of the precoding matrix may be T×N. Alternatively, the precoding matrix used to precode the reference signal may be expressed as a Kronecker product of one angle vector and one delay vector, for example, may be expressed as $a(\theta_k) \otimes b(\tau_1)$. A dimension of the precoding matrix may be T×N.

It should be understood that the mathematical expressions listed above is merely examples, and shall not constitute any limitation on this application. For example, the precoding matrix used to precode the reference signal may further be expressed as a product of conjugate transposes of one delay vector and one angle vector or a Kronecker product of one delay vector and one angle vector. A dimension of the precoding matrix may be N×T. Alternatively, the precoding matrix used to precode the reference signal may further be expressed as mathematical transformations of the various expressions above. For brevity, examples are not listed one by one herein.

In the embodiments of this application, a weighted sum of one or more angle-delay pairs can be used to determine a spatial-frequency matrix. A matrix having a dimension of T×N and determined based on one angle-delay pair may be referred to as a component of the spatial-frequency matrix, which is briefly referred to as a spatial-frequency component matrix. In the following embodiments, for ease of description, it is assumed that a matrix having a dimension of T×N and determined based on one angle-delay pair is obtained by using $a(\theta_k) \times b(\tau_1)^H$.

9. Spatial-frequency matrix: In the embodiments of this application, the spatial-frequency matrix is an intermediate parameter used to determine a precoding matrix.

In the embodiments of this application, the spatial-frequency matrix may be determined based on a receive port, or may be determined based on a transport layer. As described above, the spatial-frequency matrix may be determined by using a weighted sum of one or more angle-delay pairs. Therefore, a dimension of the spatial-frequency matrix may also be N×T.

If the spatial-frequency matrix is determined based on the receive port, the spatial-frequency matrix may be referred to as a spatial-frequency matrix corresponding to the receive port. The spatial-frequency matrix corresponding to the receive port may be used to construct a downlink channel matrix of each frequency domain unit, to determine a precoding matrix corresponding to each frequency domain unit. For example, a channel matrix corresponding to a frequency domain unit may be a conjugate transpose of a matrix constructed by using column vectors that correspond to a same frequency domain unit and that are in spatial-frequency matrices corresponding to receive ports. For example, $n^{th}$ column vectors in spatial-frequency matrices corresponding to the receive ports are extracted, and are arranged from left to right in an order of receive ports to obtain a matrix with a dimension of T×R, where R represents a quantity of receive ports, and R≥1 and is an integer. After conjugate transpose processing is performed on the matrix, a channel matrix $V^{(n)}$ of an $n^{th}$ frequency domain unit may be obtained. A relationship between the channel matrix and the spatial-frequency matrix is described in detail below, and detailed descriptions of the relationship between the channel matrix and the spatial-frequency matrix are omitted herein.

If the spatial-frequency matrix is determined based on a transport layer, the spatial-frequency matrix may be referred to as a spatial-frequency matrix corresponding to the transport layer. The spatial-frequency matrix corresponding to the transport layer may be directly used to determine a precoding matrix corresponding to each frequency domain unit. For example, a precoding matrix corresponding to a frequency domain unit may be constructed by using column vectors that correspond to a same frequency domain unit and that are in spatial-frequency matrices corresponding to transport layers. For example, $n^{th}$ column vectors in the space-frequency matrices corresponding to the transport layers are extracted, and a matrix with a dimension of T×Z may be obtained through arrangement from left to right in an order of the transport layers, where Z represents a quantity of the transport layers, Z≥1, and Z is an integer. The matrix may be used as a precoding matrix $W^{(n)}$ of an $n^{th}$ frequency domain unit.

It should be noted that a precoding matrix determined according to a channel measurement method provided in the embodiments of this application may be a precoding matrix directly used for downlink data transmission. Alternatively, some beamforming methods, for example, including zero forcing (ZF), a minimum mean-squared error (MMSE), and a maximum signal-to-leakage-and-noise ratio (SLNR), may be used, to obtain a precoding matrix finally used for downlink data transmission. This is not limited in this application. All precoding matrices below may be precoding matrices determined based on the channel measurement method provided in this application.

A relationship between a spatial-frequency matrix and a downlink channel matrix or a precoding matrix is briefly described.

The spatial-frequency matrix is an intermediate parameter that is proposed based on frequency domain continuity of channels and that may be used to construct a precoding matrix. The spatial-frequency matrix H may satisfy: $H=SCF^H$. S represents a matrix constructed by one or more (for example, K, where K is a positive integer) angle vectors, for example, $S=[a(\theta_1)\,a(\theta_2)\ldots a(\theta_K)]$. F represents a matrix constructed by one or more (for example, L, where L is a positive integer) delay vectors, for example $F=[b(\tau_1)\,b(\tau_2)\ldots b(\tau_L)]$. C represents a coefficient matrix constructed by weighting coefficients corresponding to each of the K angle vectors and each of the L delay vectors. Each element in C may represent a weighting coefficient of one corresponding angle vector pair.

In an FDD mode, due to uplink and downlink channel reciprocity of a delay and an angle, a spatial-frequency matrix $H_{UL}$ obtained through uplink channel measurement may be expressed as $H_{UL}=SC_{UL}F^H$, and a spatial-frequency matrix $H_{DL}$ obtained through downlink channel measurement may be expressed as $H_{DL}=SC_{DL}F^H$. Therefore, in the embodiments of this application, a coefficient matrix $C_{DL}$ corresponding to the downlink channel is determined through downlink channel measurement and fed back, to determine a precoding matrix that adapts to the downlink channel.

As described above, the spatial-frequency component matrix is defined as being determined by $a(\theta_k)\times b(\tau_l)^H$. Therefore, it may be determined that a dimension of the spatial-frequency matrix $H_{DL}$ is: a quantity of transmit antenna ports×a quantity of frequency domain units. For example, the dimension of the spatial-frequency matrix corresponding to the downlink channel is T×N. In the following embodiments, unless otherwise specified, the spatial-frequency matrix is the matrix $H_{DL}$ with a dimension of T×N described above.

However, this is not necessarily a spatial-frequency matrix determined by using an actual channel. In general, a dimension of a channel matrix is defined as: a quantity of receive ports×a quantity of transmit ports. For example, the dimension of the downlink channel is R×T. The dimension of the spatial-frequency matrix determined by using the channel matrix is N×T, and is exactly opposite to the dimension T×N of the foregoing spatial-frequency matrix $H_{DL}$. Therefore, in the embodiments of this application, the actual channel may be a conjugate transpose of a channel matrix determined by using the foregoing spatial-frequency matrix $H_{DL}$. In other words, the downlink channel matrix determined by using the spatial-frequency matrix $H_{DL}$ may be the conjugate transpose of the actual channel.

Further, a precoding matrix may be determined by using the spatial-frequency matrix $H_{DL}$. The precoding matrix of the $n^{th}$ frequency domain unit may be constructed by the $n^{th}$ column vectors in the spatial-frequency matrices corresponding to the transport layers.

For example, singular value decomposition (SVD) is performed on the channel matrix. The conjugate transpose of the precoding matrix may be obtained by performing SVD on the channel matrix V. However, if SVD is performed on a conjugate transpose of the channel matrix, that is, SVD is performed on $V^H$, the precoding matrix may be exactly obtained. Therefore, in the embodiments of this application, the spatial-frequency matrix $H_{DL}$ determined by using the conjugate transpose of the actual channel may be used to directly determine the precoding matrix corresponding to each frequency domain unit.

A relationship between the spatial-frequency matrix and the downlink channel matrix is understood with reference to the foregoing formula $H_{UL}=SC_{UL}F^H$.

$S^H H_{DL}=C_{DL}F^H$ may be obtained by transforming $H_{DL}=SC_{DL}F^H$, and $(H_{DL}{}^H S)^H=C_{DL}F^H$ may be obtained through further transformation. In this way, a coefficient matrix $C_{DL}=(H_{DL}{}^H S)^H F$ may be obtained. $H_{DL}{}^H$ is the spatial-frequency matrix determined by using the actual channel, and $H_{DL}{}^H S$ is the actual channel obtained through space domain precoding. In the coefficient matrix, each element in $C_{DL}$ may be determined by multiplying one row in $(H_{DL}{}^H S)^H$ by one column in F. In other words, each element in the matrix coefficient $C_{DL}$ may be obtained by multiplying one row in the conjugate transpose $(H_{DL}{}^H S)^H$ of the actual channel $H_{DL}{}^H S$ by one column in F, or is obtained by multiplying a conjugate transpose of one column in the actual channel $H_{DL}{}^H S$ by one column in F.

Therefore, in the embodiments of this application, the spatial-frequency matrix $H_{DL}$ determined based on the weighting coefficient of each angle-delay pair fed back by the terminal device may be obtained by using the conjugate transpose of the actual channel. In other words, the spatial-frequency matrix in the embodiments of this application may alternatively be obtained by the conjugate transpose (namely, $V^H$) of the actual channel V.

It should be understood that a relationship between the actual channel and the spatial-frequency matrix $H_{DL}$ is not fixed. The relationship between the actual channel and the spatial-frequency matrix $H_{DL}$ may vary according to different definitions of the spatial-frequency matrix and the spatial-frequency component matrix. For example, the spatial-frequency matrix $H_{DL}$ may be obtained based on the conjugate transpose of the actual channel, or may be obtained based on a transpose of the actual channel.

When the spatial-frequency matrix and the spatial-frequency component matrix are defined differently, operations performed by the network device when the delay and the angle are loaded are also different, and operations performed by the terminal device when the terminal device performs channel measurement and provides a feedback correspondingly change. However, these are only implementation behaviors of the terminal device and the network device, and shall not constitute any limitation on this application. In the embodiments of this application, merely for ease of understanding, a case in which the spatial-frequency matrix is obtained based on the conjugate transpose of the actual channel is shown. The definition of the channel matrix, the dimension and the definition of the spatial-frequency matrix, and a transformation relationship between the channel matrix and the spatial-frequency matrix are not limited in this application. Similarly, a transformation relationship between the spatial-frequency matrix and the precoding matrix is not limited in this application either.

In the embodiments of this application, the network device may determine, based on a feedback of the terminal device, a precoding matrix corresponding to each frequency domain unit.

In addition, for ease of understanding the embodiments of this application, the following descriptions are provided.

First, for ease of understanding, the following briefly describes main parameters in this application:

P: a quantity of transmit ports, where P is a positive integer;

R: a quantity of receive ports, where R is a positive integer;

N: a quantity of RBs used to carry a reference signal, where N is a positive integer;

K: a quantity of angle vectors, where K is a positive integer; and

L: a quantity of delay vectors, where L is a positive integer.

Second, in the embodiments of this application, for ease of description, when numbering is involved, numbers may be consecutive and start from 0. For example, K angle vectors may include the $0^{th}$ angle vector to a $(K-1)^{th}$ angle vector, and L delay vectors may include the $0^{th}$ delay vector to an $(L-1)^{th}$ delay vector. For brevity, examples are not listed one by one herein. Certainly, a specific implementation is not limited thereto. For example, consecutive numbering may be performed from 1. For example, K angle vectors may include the first angle vector to a $K^{th}$ angle vector, and the L delay vectors may include the first delay vector to an $L^{th}$ delay vector.

It should be understood that the foregoing descriptions are all provided for ease of describing the technical solutions provided in the embodiments of this application, but are not intended to limit the scope of this application.

Third, in this application, transformation of a matrix and a vector is involved in many places. For ease of understanding, unified descriptions are provided herein. A superscript T indicates a transpose. For example, $A^T$ indicates a transpose of a matrix (or vector) A. A superscript H indicates a conjugate transpose. For example, $A^H$ represents a conjugate transpose of a matrix (or vector) A. For brevity, descriptions of a same or similar case are omitted below.

Fourth, in the embodiments shown below, an example in which both the angle vector and the delay vector are column vectors is used to describe the embodiments provided in this application. However, this shall not constitute any limitation on this application. Based on a same concept, a person skilled in the art may further figure out more possible representations.

Fifth, in this application, "being used to indicate" may include "being used to directly indicate" and "being used to indirectly indicate". When a piece of indication information is described as being used to indicate A, the indication information may directly indicate A or indirectly indicate A, but it does not necessarily indicate that the indication information carries A.

The information indicated by the indication information is referred to as to-be-indicated information. In a specific implementation process, there are a plurality of manners of indicating the to-be-indicated information, for example, but not limited to, the following manners: The to-be-indicated information is directly indicated, for example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already learned of or agreed on in advance. For example, specific information may alternatively be indicated by using an arrangement sequence of all information that is agreed on in advance (for example, stipulated in a protocol), to reduce indication overheads to some extent. In addition, a common part of all information may further be identified and indicated together, to reduce indication overheads caused by separately indicating the same information. For example, a person skilled in the art should understand that a precoding matrix includes precoding vectors, and each precoding vector in the precoding matrix may have a same part in terms of composition or another attribute.

In addition, a specific indication manner may alternatively be various existing indication manners, for example, but not limited to, the foregoing indication manners and various combinations thereof. For details of various indication manners, refer to the conventional technology. Details are not described in this specification. It can be learned from the foregoing descriptions that, for example, when a plurality of pieces of information of a same type need to be indicated, manners of indicating different information may be different. In a specific implementation process, a required indication manner may be selected based on a specific requirement. The selected indication manner is not limited in the embodiments of this application. In this way, the indication manners in the embodiments of this application should be understood as covering various methods that enable a to-be-indicated party to learn of to-be-indicated information.

In addition, the to-be-indicated information may have another equivalent form. For example, a row vector may be represented as a column vector; a matrix may be represented by using a transposed matrix of the matrix; the matrix may alternatively be represented in a form of a vector or an array; and the vector or the array may be formed by connecting row vectors or column vectors in the matrix. The technical solutions provided in the embodiments of this application should be understood as covering various forms. For example, some or all features in the embodiments of this application should be understood as covering various representations of the features.

The to-be-indicated information may be sent as a whole, or may be divided into a plurality of pieces of sub-information for separate sending, and sending periods and/or sending occasions of these pieces of sub-information may be the same or different. A specific sending method is not limited in this application. The sending periodicities and/or the sending occasions of the sub-information may be predefined, for example, predefined according to a protocol, or may be configured by a transmit end device by sending configuration information to a receive end device. The configuration information may include, for example, but not limited to, one or a combination of at least two of radio resource control signaling, media access control (MAC) layer signaling, and physical layer signaling. The radio resource control signaling includes, for example, radio resource control (RRC) signaling. The MAC layer signaling includes, for example, a MAC control element (CE). The physical layer signaling includes, for example, downlink control information (DCI).

Sixth, definitions of many features (for example, the Kronecker product, the channel state information (CSI), the RB, the angle, and the delay) listed in this application are merely used to description functions of the features by using examples. For detailed content thereof, refer to the conventional technology.

Seventh, the terms "first", "second", and various numbers in the following embodiments are merely used for distinguishing for ease of description, and are not intended to limit the scope of the embodiments of this application. For example, the terms are used to distinguish between different indication information.

Eighth, "predefinition" or "preconfiguration" may be implemented by pre-storing corresponding code or a corresponding table in a device (for example, including a terminal device or a network device) or in another manner that can be used to indicate related information. A specific implementation of "predefinition" or "preconfiguration" is not limited in this application. "Storage" may be storage in one or more memories. The one or more memories may be separately disposed, or may be integrated into an encoder or a decoder, a processor, or a communication apparatus. Alternatively, some of the one or more memories may be separately disposed, and some of the one or more memories are integrated into a decoder, a processor, or a communication apparatus. A type of the memory may be a storage medium in any form. This is not limited in this application.

Ninth, a "protocol" in the embodiments of this application may be a standard protocol in the communications field, for example, may include an LTE protocol, an NR protocol, and a related protocol applied to a future communication system. This is not limited in this application.

Tenth, "at least one" refers to one or more, and "a plurality of" refers to two or more. The term "and/or" describes an association relationship between associated objects and represents that three relationships may exist. For example, A and/or B may represent the following cases: Only A exists, both A and B exist, and only B exists, where A and B may be singular or plural. The character "/" generally represents an "or" relationship between the associated objects. At least one of the following items (pieces) or a similar expression thereof indicates any combination of these items, including a single item (piece) or any combination of a plurality of items (pieces). For example, at least one of a, b, and c may represent: a, b, c, a and b, a and c, b and c, or a, b, and c, where a, b, and c each may be singular or plural.

Eleventh, in the embodiments of this application, descriptions such as "when", "in a case", and "if" mean that a device (for example, a terminal device or a network device) performs corresponding processing in an objective situation, and are not intended to limit time, and the device (for example, the terminal device or the network device) is not required to perform a determining action during implementation, and do not mean any other limitation.

Twelfth, in the embodiments of this application, a transmit port and a receive port are mentioned in a plurality of places. To avoid ambiguity, the following descriptions are provided: The transmit port may be a port for transmitting a reference signal (for example, a precoded reference signal). The receive port may be a port for receiving a reference signal (for example, a precoded reference signal). In the embodiments of this application, the transmit port may be a port at a network device end, and the receive port may be a port at a terminal device end.

Thirteenth, in the embodiments of this application, an RB may be a physical resource block (PRB), or may be a common resource block (CRB). This is not limited in this application. The PRB is numbered by using a start position of a resource (for example, a bandwidth part (bandwidth, BWP)) scheduled for a terminal device as a reference point, and the CRB is numbered by using a start position of a broadband as a reference point. For specific definitions of the PRB and the CRB, refer to the conventional technology. For brevity, details are not described herein.

For ease of understanding, the following describes the method in the embodiments of this application by using a PRB as an example of an RB. Therefore, the RBs in the following descriptions may be replaced with PRBs.

As can be learned from the description above with reference to FIG. 2, when precoding a reference signal based on a delay vector, the network device respectively loads N elements in the delay vector to N RBs. Precoders used on every two neighboring RBs have a phase difference of $-j2\pi\Delta f\tau$. In other words, a difference between angles at which phase rotation is performed on channels of every two neighboring RBs is $-j2\pi\Delta f\tau$. Herein, $\Delta f = f_1 - f_0 = \ldots = f_{N-1} - f_{N-2}$. Due to existence of $\Delta f$, equivalent channels of a same port are inconsecutive in frequency domain. Therefore, the terminal device may not perform channel estimation in a PRB bundling manner. This limits channel estimation accuracy, and therefore, limits subsequent channel measurement accuracy. However, the network device needs to determine, based on a channel measurement result reported by the terminal device, a precoding matrix used for downlink data transmission. It is possible that the determined precoding matrix cannot be well adapted to a downlink channel due to limited channel measurement accuracy. Consequently, downlink transmission performance of a system is affected.

In view of this, this application provides a method for configuring a transmit port of a downlink reference signal, so that channel estimation can be performed and accuracy can be improved in the PRB bundling manner, thereby improving the downlink transmission performance of downlink transmission.

The method for configuring a transmit port of a downlink reference signal provided in the embodiments of this application is described in detail below with reference to the accompanying drawings.

It should be understood that the following is merely provided for ease of understanding and description. Interaction between a terminal device and a network device is used as an example to describe in detail the method provided in the embodiments of this application. However, this shall not constitute any limitation on an execution body of the method provided in this application. For example, a terminal device shown in the following embodiments may be replaced with a component (such as a chip or a chip system) configured in the terminal device. A network device shown in the following embodiments may also be replaced with a component (such as a chip or a chip system) configured in the network device.

A specific structure of the execution body of the method provided in the embodiments of this application is not specifically limited in the embodiments shown below, provided that a program that records code of the method provided in the embodiments of this application can be run to perform communication according to the method provided in the embodiments of this application. For example, the method provided in the embodiments of this application may be performed by a terminal device or a network device, or a functional module that is in the terminal device or the network device and that can invoke and execute the program.

Figure 3:
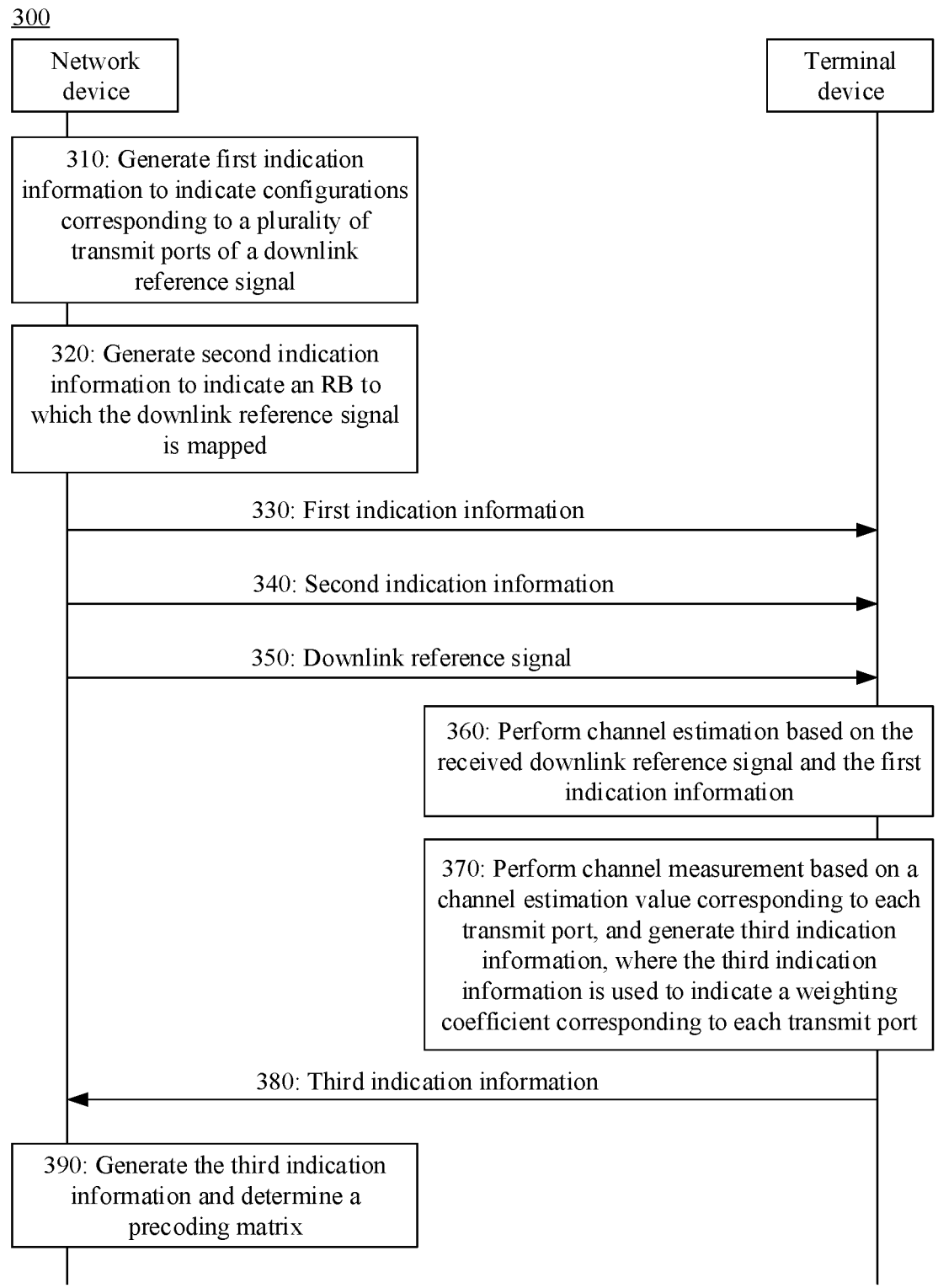
FIG. 3 is a schematic flowchart of a method for configuring a transmit port of a downlink reference signal according to an embodiment of this application.

The method for configuring a transmit port of a downlink reference signal provided in the embodiments of this application is described in detail below with reference to FIG. 3. FIG. 3 is a schematic flowchart of a method 300 for configuring a transmit port of a downlink reference signal according to an embodiment of this application from a perspective of device interaction. The method 300 shown in FIG. 3 may include steps 310 to 390. The following describes the steps in the method 300 in detail.

In step 310, a network device generates first indication information, where the first indication information is used to indicate configurations corresponding to a plurality of transmit ports of a downlink reference signal.

As described above, each transmit port of a downlink reference signal may be associated with one angle-delay pair. One angle-delay pair may be a combination of one angle and one delay. Each angle-delay pair may include one angle vector and one delay vector. That each transmit port is associated with one angle-delay pair may be understood as that each transmit port is associated with one angle vector and one delay vector. A reference signal of each transmit port may be obtained based on the associated angle vector and delay vector. Therefore, when the transmit port is associated with the angle-delay pair, the transmit port is associated with the delay.

In this embodiment of this application, different delay information may be defined based on different values of delays. In a possible design, different delay information may refer to delays with different values. Each piece of delay information may correspond to one delay.

In another possible design, different delay information may refer to different magnitude relationships between values of delays and a predetermined value. In still another possible design, different delay information may refer to different magnitude relationships between values of delays and a value of a reference delay. Each piece of delay information may correspond to one or more delays. Magnitude relationships between the one or more delays and a predetermined value or a value of a reference delay are the same.

For example, the predetermined value may be a value predefined in a protocol, or may be a value pre-agreed on by the network device and a terminal device. This is not limited in this application. For example, the predetermined value may be an average value of delays associated with the plurality of transmit ports of the downlink reference signal. A specific manner for determining the predetermined value is not limited in this application.

Different delay information may be defined based on different magnitude relationships between values of delays and the predetermined value. For example, when one or more delays associated with one or more of the plurality of transmit ports of the downlink reference signal are greater than or equal to the predetermined value, the one or more delays may be defined as same delay information, for example, are denoted as delay information 1; when delays associated with one or more transmit ports on the plurality of transmit ports of the downlink reference signal is less than the predetermined value, the delays associated with the one or more transmit ports may be defined as same delay information, for example, are denoted as delay information 2. It may be understood that magnitude relationships between the delay information 1 and the delay information 2 and the same predetermined value are different. Therefore, the delay information 1 and the delay information 2 are different delay information.

It should be understood that a quantity of predetermined values is not limited to 1, for example, may be 2 or more. One or more pieces of delay information may be defined based on different quantities of predetermined values. For brevity, examples are not described one by one herein.

It should further be understood that in this application, an association between delay information and a transmit port may be understood as an implicit/indirect association. For example, the delay information includes delay information A (representing "a larger delay") and delay information B (representing "a smaller delay"). If a transmit port 1 and a transmit port 2 are respectively associated with a delay 1 and a delay 2, a transmit port 3 is associated with a delay 3, and according to preset rule or agreement, it is determined that the delay 1 and the delay 2 are larger delays and the delay 3 is a smaller delay, it means that both the transmit port 1 and the transmit port 2 are associated with the delay information A and the transmit port 3 is associated with the delay information B.

For another example, the reference delay may be a delay associated with one of the plurality of transmit ports of the downlink reference signal. A delay associated with a specific transmit port and used as the reference delay may be predefined in a protocol, or may be pre-agreed on by the network device and the terminal device. This is not limited in this application. For example, a delay in a plurality of delays that is closest to an average value of the plurality of delays is used as the reference delay; or it is predetermined that a plurality of delays are arranged in an order of values, and a delay in a specific position is used as the reference delay. A specific manner for determining the reference delay is not limited in this application.

Different delay information may also be defined based on different magnitude relationships between values of delays and the value of the reference delay. For example, when one or more delays associated with one or more of the plurality of transmit ports of the downlink reference signal are greater than or equal to the value of the reference delay, the one or more delays may be defined as same delay information, for example, are denoted as delay information 1; when delays associated with one or more transmit ports on the plurality of transmit ports of the downlink reference signal is less than the value of the reference delay, the delays associated with the one or more transmit ports may be defined as same delay information, for example, are denoted as delay information 2. It may be understood that magnitude relationships between the delay information 1 and the delay information 2 and a same value of the reference delay are different. Therefore, the delay information 1 and the delay information 2 are different delay information.

It should be understood that a quantity of reference delays is not limited to 1, for example, may be 2 or more. One or more pieces of delay information may be defined based on different quantities of reference delays. For brevity, examples are not described one by one herein.

In this embodiment of this application, the network device may configure one or more of a precoding resource bundling granularity, a subband size, and a pilot density based on transmit ports associated with different delay information. Transmit ports associated with same delay information correspond to a same configuration, and at least two transmit ports associated with different delay information correspond to different configurations.

The precoding resource bundling granularity may specifically refer to a quantity of RBs using a same precoder, for example but not limited to, a quantity of RBs using a same delay vector element or with a same phase rotation angle when precoding is performed based on one delay vector. In other words, one or more RBs may be bundled together for phase rotation. Therefore, a resource granularity formed by the one or more RBs that may be bundled together for same precoding (for example, phase rotation) is referred to as a PRG. A phase rotation angle of each RB in a same PRG is the same. The precoding resource bundling granularity may also be referred to as a PRG granularity. In the following embodiments, the precoding resource bundling granularity and the PRG granularity are alternately used. It should be understood that the meanings of the two are the same.

It may be understood that one PRG may include a plurality of RBs. Therefore, when a measurement bandwidth is specified, the quantity of PRGs decreases as the precoding resource bundling granularity increases, and a length of a used delay vector also decreases along with it. For example, there are N RBs in total in the measurement bandwidth, and one PRB includes two RBs, the quantity of PRGs is $\lceil N/2 \rceil$.

Figure 4:
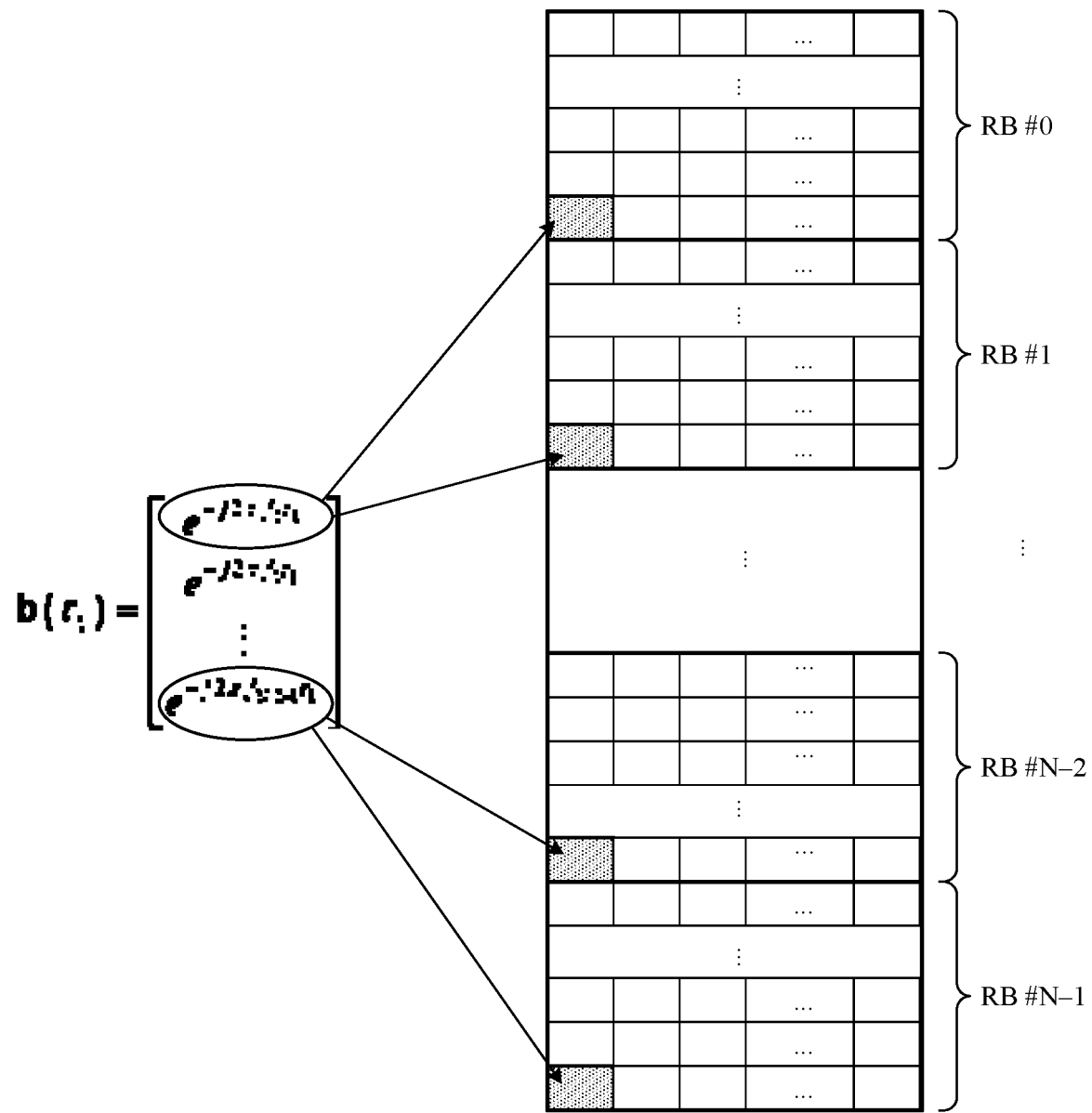
FIG. 4 is a schematic diagram showing that a precoding resource bundling granularity is 2 according to an embodiment of this application.

For ease of understanding and description, the precoding resource bundling granularity is described in detail herein with reference to FIG. 4. FIG. 4 show an example in which a reference signal is precoded based on a delay vector $b(\tau_1)$ and a precoding resource bundling granularity is 2. Because the precoding resource bundling granularity is 2, a length of the delay vector is $\lceil N/2 \rceil$. It is assumed that N is an even number. In this case, $$b(\tau_1) = \begin{bmatrix} e^{-j2\pi f_0 \tau_1} \\ e^{-j2\pi f_1 \tau_1} \\ \vdots \\ e^{-j2\pi f_{N/2-1} \tau_1} \end{bmatrix}.$$

As shown in the figure, an RB #0 and an RB #1 are one PRG, correspond to $e^{-j2\pi f_0 \tau_1}$, and a phase rotation angle is $f_0 \tau_1$; . . . ; and an RB #N−2 and an RB #N−1 are one PRG, correspond to $e^{-j2\pi f_{N/2-1} \tau_1}$, and a phase rotation angle is $f_{N/2-1} \tau_1$. In this way, N/2 PRGs can be obtained.

It should be understood that the foregoing description is provided merely for ease of understanding, and an example of performing phase rotation on N RBs (or N/2 PRGs) based on the delay vector with a length N/2 by using the example in which N is an even number is shown. If N is an odd number, and as described above, the length of the delay vector is $\lceil N/2 \rceil$, the first or last RB in the N RBs may exist as an independent PRG, or one of the N RBs may exist as an independent PRG. This is not limited in this application.

In this embodiment of this application, a subband size corresponding to a transmit port is further defined. In a possible design, one subband may correspond to one PRG, in other words, one subband is one PRG or the subband size is the same as the precoding resource bundling granularity. For example, in the foregoing description provided with reference to FIG. 4, if N is an even number, the RB #0 and the RB #1 may be one subband, . . . , and the RB #N−2 and the RB #N−1 may be one subband. There are N/2 subbands in total. If N is an odd number, the first or last RB in the N RBs may exist as an independent subband. For example, the RB #0 and the RB #1 may be one subband, . . . , an RB #N−3 and the RB #N−2 may be one subband, and the RB #N−1 may be one subband. There are (N+1)/2 subbands in total.

It should be understood that the foregoing description is provided merely for ease of understanding, and an example in which the precoding resource bundling granularity is 2 is shown. However, this shall not constitute any limitation on this application. For example, the precoding resource bundling granularity may alternatively be 4, 8, 12, or the like; or may be 1. A value of the precoding resource bundling granularity is not limited in this application. Correspondingly, a specific value of the subband size is not limited in this application either.

It should be noted that when a plurality of RBs are defined as one PRG, corresponding phase rotation angles are consistent. In other words, the network device performs precoding by bundling the plurality of RBs together. Equivalent channels received based on the plurality of RBs are consecutive, and a phase angle of $-j2\pi\Delta f\tau$ does not exist. Therefore, the terminal device may perform channel estimation by bundling the plurality of RBs together.

The pilot density may be specifically a quantity of REs occupied by each port in a specified resource unit (such as a PRB) or an average quantity of REs occupied by a plurality of ports in a specified resource unit. For ease of understanding and description, an RE used to carry a reference signal is briefly referred to as a reference signal RE. For example, if a pilot density of a reference signal of a port is 1, it may indicate that in a bandwidth occupied by the reference signal of the port, each RB has a reference signal RE. For another example, if a pilot density of a reference signal of a port is 0.5, it may indicate that in a bandwidth occupied by the reference signal of the port, one of every two RBs includes a reference signal RE, in other words, neighboring RBs used to carry the reference signal of the port are separated by an RB. For still another example, if a pilot density of a reference signal of a port is 2, it may indicate that in a bandwidth occupied by the reference signal of the port, each RB has two reference signal REs.

For a related description about the pilot density, refer to a conventional technology. For example, refer to a related description about the pilot density in an NR protocol. For brevity, details are not described herein.

In a possible design, the network device may configure one or more of a precoding resource bundling granularity, a subband size, and a pilot density for each transmit port of a downlink reference based on different delay values (that is, an example of delay information). In an implementation, the subband size is the same as the precoding resource bundling granularity.

Optionally, a transmit port associated with a delay with a large value is configured with a small precoding resource bundling granularity. That is, the PRG granularity is small.

Optionally, a subband size corresponding to a transmit port associated with a delay with a large value is configured as a small subband size.

Optionally, a transmit port associated with a delay with a large value is configured with a large pilot density.

Optionally, a transmit port associated with a delay with a small value is configured with a large precoding resource bundling granularity. That is, the PRG granularity is large.

Optionally, a subband size corresponding to a transmit port associated with a delay with a small value is configured as a large subband size.

Optionally, a port associated with a delay with a small value is configured with a small pilot density.

It should be understood that the plurality of foregoing configurations may be used separately or may be used in combination. This is not limited in this application.

From the perspective of channel estimation, a larger PRG granularity indicates higher channel estimation accuracy. However, when the PRG granularity increases to a value, the channel estimation accuracy may converge. Therefore, an accuracy gain of channel estimation brought by an increase of the PRG granularity is related to a channel environment. A more intense change of a channel in frequency domain indicates a smaller channel estimation interpolation loss. In this case, the increase of the PRG granularity facilitates a limited accuracy gain of channel estimation.

Therefore, in this embodiment of this application, a larger delay value indicates a more intense change of a channel precoded based on the delay in frequency domain. For example, there is large phase rotation between two neighboring RBs. Bundling a plurality of RBs together for channel estimation brings a limited accuracy gain of channel estimation. Therefore, it is not necessary to bind the plurality of RBs together for channel estimation. Therefore, the precoding resource bundling granularity may be set to a small value, and the corresponding subband size may also be set to a small value. Alternatively, the pilot density may be set to a large value, so that the terminal device performs channel estimation based on more reference signals. Therefore, a more accurate channel estimation value can be obtained.

On the contrary, a small delay value indicates a flat change of a channel precoded based on the delay in frequency domain. For example, there is a small phase rotation angle between two neighboring RBs, which is even 0. It is suitable to bind a plurality of RBs together for channel estimation, and a channel estimation value obtained by bundling the plurality of RBs together for channel estimation is more accurate. Therefore, the precoding resource bundling granularity may be set to a large value, and the corresponding subband size may also be set to a large value. Alternatively, because the change of the channel in frequency domain is flat, it is not necessary to set a high pilot density. Therefore, the pilot density may be set to a small value to reduce pilot overheads.

It should be noted that the channel estimation value described above may specifically refer to an equivalent channel obtained by the terminal device through estimation based on a received reference channel.

For example, it is assumed that delay vectors $b(\tau_1)$ and $b(\tau_2)$ respectively corresponding to delays $\tau_1$ and $\tau_2$ with different values are loaded to a reference signal, where $\tau_1 > \tau_2$. In this case, a port associated with the delay $\tau_1$ may be configured with a small precoding resource bundling granularity. If the precoding resource bundling granularity is two RBs, a subband size corresponding to the port may be two RBs. Alternatively, a large pilot density may be configured. For example, the pilot density is 1, that is, each RB has one reference signal RE, in other words, the reference signal of the port is mapped to each RB. A port associated with the delay $\tau_2$ may be configured with a large precoding resource bundling granularity. If the precoding resource bundling granularity is four RBs, a subband size corresponding to the port may be four RBs. Alternatively, a small pilot density may be configured. For example, the pilot density is 0.5, that is, every two RBs has one reference signal RE, in other words, an RB to which the reference signal of the port is mapped exists at an interval of one RB.

In another possible design, the network device may configure one or more of a precoding resource bundling granularity, a subband size, and a pilot density for each transmit port of a downlink reference based on different magnitude relationships between values of delays and a predetermined value.

Optionally, transmit ports associated with one or more delays whose values are greater than or equal to the predetermined value, for example, the delay information 1, each are configured with a small precoding resource bundling granularity. That is, the PRG granularity is small.

Optionally, subband sizes corresponding to transmit ports associated with one or more delays whose values are greater than or equal to the predetermined value, for example, the delay information 1, are configured as small subband sizes.

Optionally, transmit ports associated with one or more delays whose values are greater than or equal to the predetermined value, for example, the delay information 1, each are configured with a large pilot density.

Optionally, transmit ports associated with one or more delays whose values are less than the predetermined value, for example, the delay information 2, each are configured with a large precoding resource bundling granularity.

Optionally, subband sizes corresponding to transmit ports associated with one or more delays whose values are less than the predetermined value, for example, the delay information 2, are configured as large subband sizes.

Optionally, transmit ports associated with one or more delays whose values are less than the predetermined value, for example, the delay information 2, each are configured with a small pilot density.

In still another possible design, the network device may configure one or more of a precoding resource bundling granularity, a subband size, and a pilot density for each transmit port of a downlink reference based on different magnitude relationships between values of delays and a value of a reference delay.

Optionally, transmit ports associated with one or more delays whose values are greater than or equal to the value of the reference delay, for example, the delay information 1, each are configured with a small precoding resource bundling density. That is, the PRG granularity is small.

Optionally, subband sizes corresponding to transmit ports associated with one or more delays whose values are greater than or equal to the value of the reference delay, for example, the delay information 1, are configured as small subband sizes.

Optionally, transmit ports associated with one or more delays whose values are greater than or equal to the value of the reference delay, for example, the delay information 1, each are configured with a large pilot density.

Optionally, transmit ports associated with one or more delays whose values are less than the value of the reference delay, for example, the delay information 2, each are configured with a large precoding resource bundling granularity.

Optionally, subband sizes corresponding to transmit ports associated with one or more delays whose values are less than the value of the reference delay, for example, the delay information 2, are configured as large subband sizes.

Optionally, transmit ports associated with one or more delays whose values are less than the value of the reference delay, for example, the delay information 2, each are configured with a small pilot density.

After one or more delays classified as the same delay information are used for precoding, changes of channels in frequency domain are similar. Therefore, a configuration may be provided for ports associated with the one or more delays classified as the same delay information. For example, after one or more delays classified as the delay information 1 are separately used for precoding, changes of channels in frequency domain are intense. Therefore, a small precoding resource bundling granularity, a small subband size, and a large pilot density may be configured. After one or more delays classified as the delay information 2 are separately used for precoding, changes of channels in frequency domain are flat. Therefore, a large precoding resource bundling granularity, a large subband size, and a small pilot density may be configured.

It should be understood that the foregoing description is provide merely for ease of understanding and description. The foregoing describes the configuration of each transmit port of the downlink reference signal in detail by using the delay information 1 and the delay information 2 as examples. However, this shall not constitute any limitation on this application. As described above, the quantity of predetermined values and the quantity of reference delays are not limited in this application. In other words, there may be a plurality of different configurations for transmit ports associated with a plurality of pieces of delay information. For example, the delay information 1, the delay information 2, and the delay information 3 may be determined based on two predetermined values, and configurations of transmit ports associated with the delay information 2, and the delay information 3 may also be different. For example, the precoding resource bundling granularity configured for the transmit port associated with the delay information 1 is 2, the precoding resource bundling granularity configured for transmit port associated with the delay information 2 is 4, and the precoding resource bundling granularity configured for the transmit port associated with the delay information 3 is 8. However, it should be understood that it is not limited in this application that delay information is in a one-to-one correspondence with configurations. For example, configurations for ports associated with different delay information may be the same. For example, the pilot density configured for the transmit port associated with the delay information 1 is 2, and pilot densities configured for transmit ports associated with the delay information 2 and the delay information 3 are 1. For brevity, examples are not listed one by one herein. Any case in which at least two transmit ports associated with different delay information correspond to different configurations shall fall within the protection scope of this application.

Based on the different configurations for the transmit ports associated with the delay information, the network device may generate first indication information to indicate configurations corresponding to all transmit ports of a downlink reference signal.

In a possible implementation, the network device may indicate the configurations corresponding to all the transmit ports by using a plurality of information elements. For example, the network device indicates a configuration corresponding to a transmit port 1 by using an information element 1. The information element 1 may include, for example, a port number of the port 1 and one or more of the following: a precoding resource bundling granularity, a subband size, and a pilot density. The transmit port 1 may be any one of the plurality of transmit ports of the downlink reference signal.

The precoding resource bundling granularity may be, for example, directly indicated by using a quantity of RBs, or a PRG granularity configured for each transmit port may be indicated based on correspondences between predetermined PRGs with different granularities and a quantity of RBs.

In an example, correspondences between a plurality of PRGs with different granularities and a quantity of included RBs may be predefined in a protocol. Alternatively, the network device may indicate, to the network device in advance, correspondences between a plurality of PRGs with different granularities and a quantity of included RBs by using higher layer signaling such as an RRC message or a MAC CE. The following table shows an example of the correspondences between PRGs with different granularities and a quantity of included RBs.

| Index | PRG   | Quantity of RBs |
|-------|-------|-----------------|
| 0     | PRG-0 | 2               |
| 1     | PRG-1 | 4               |
| 2     | PRG-2 | 8               |
| 3     | PRG-3 | 16              |

It should be understood that the foregoing table is merely an example for ease of understanding, and shall not constitute any limitation on this application. The quantity of RBs included in the PRGs with different granularities is not limited in this application.

It should be further understood that the foregoing table is merely an example of the correspondences for ease of understanding. A person skilled in the art may make equivalent variations on the table based on a same concept, and these variations fall within the protection scope of this application. For example, either of the second column and the third column in the table is deleted to create a new table, or the foregoing table may be split into two different tables, respectively including a correspondence between an index and a PRG granularity and a correspondence between an index and a quantity of RBs. Alternatively, the quantity of RBs and the like may be represented in a different manner. For brevity, examples are not listed one by one herein.

The transmit port 1 is used as an example. The network device may indicate, in an information element 1 based on the correspondence, an index (or an identifier) corresponding to a precoding resource bundling granularity (or a PRG granularity) configured for the transmit port 1. The information element 1 may be, for example, an information element in DCI. In other words, the network device may dynamically indicate, by using the DCI, a PRG granularity configured for each transmit port of the downlink reference signal.

As can be learned, the PRG granularity configured for each transmit port of the downlink reference signal may be indicated by combining higher layer signaling and physical layer signaling. For example, the correspondences between the plurality of PRGs with different granularities and the quantity of included RBs are indicated by using the higher layer signaling, and a PRG granularity configured for each transmit port is dynamically indicated by using the physical layer signaling. In other words, an indication for the PRG granularity is carried in two or three of an RRC message, a MAC CE, and DCI.

The PRG granularity configured for each transmit port of the downlink reference signal may be indicated by using physical layer signaling. For example, the correspondences between the plurality of PRG granularities and the quantity of included RBs may be predefined in a protocol, and the PRG granularity configured for each transmit port may be indicated by using physical layer signaling such as DCI; or a quantity of RBs included in a PRG configured for each transmit port may be directly indicated by using physical layer signaling such as DCI.

It should be understood that the foregoing example for the PRG granularity configured for each transmit port is merely provided for ease of understanding, and shall not constitute any limitation on this application. A specific manner in which the network device indicates the PRG granularity configured for each transmit port is not limited in this application.

It should be further understood that the signaling listed above and used to indicate the precoding resource bundling granularity is merely examples, and shall not constitute any limitation on this application.

The subband size may be the same as the precoding resource bundling granularity. Therefore, the subband size may be indicated in a manner similar to the foregoing manners. It only needs to replace the precoding resource bundling granularity in the foregoing description with the subband size.

A precoding resource bundling granularity configured for a transmit port is defined as a subband size corresponding to the transmit port. Therefore, in a possible implementation, the network device may indicate only one of the precoding resource bundling granularity and the subband size in the first indication information. For example, when the network device indicates a subband size corresponding to each transmit port of the downlink reference signal in the first indication information, the terminal device may consider that a plurality of RBs corresponding to the subband size are bundled together for precoding, and therefore may be bundled together for channel estimation.

The pilot density may be, for example, indicated by using existing signaling, for example, is indicated in DCI, or may be indicated by using newly added signaling. This is not limited in this application.

In an example, a plurality of different pilot densities may be predefined in a protocol. Alternatively, the network device may indicate, to the network device in advance, a plurality of different pilot densities by using higher layer signaling such as an RRC message or a MAC CE. The network device may select, based on the foregoing delay information from the plurality of pilot densities, a pilot density configured for each transmit port, and further dynamically indicate, to the terminal device by using DCI, the pilot density configured for each transmit port. The pilot density indicated by the DCI may be, for example, a value of the pilot density, or may be information, such as an index or an identifier corresponding to a value of the pilot density, that can uniquely identify one pilot density. This is not limited in this application.

Therefore, the pilot density configured for each transmit port of the downlink reference signal may be indicated by combining higher layer signaling and physical layer signaling, or may be indicated by using only physical layer signaling. This is not limited in this application.

It may be understood that when the pilot density is less than 1, not each RB includes a reference signal RE. Therefore, the network device may further indicate the RB to which the reference signal is mapped. For ease of understanding, an RB including a reference signal RE is referred to as a reference signal RB. It should be understood that the reference signal RB is defined merely for ease of description, and shall not constitute any limitation on this application. The reference signal RB is not limited to being used to carry the reference signal. Some REs in the reference signal RB are used to carry the reference signal, and another RE that is not used to carry the reference signal may further be used to carry data and the like. This is not limited in this application.

Optionally, the method further includes step 320: Generate second indication information, where the second indication information is used to indicate an RB to which a downlink reference signal is mapped.

For example, when the pilot density is ½, there is one reference signal RB at an interval of every two consecutive RBs. For another example, when the pilot density is ⅓, there is one reference signal RB at an interval of every two RBs. It should be understood that the pilot densities listed above are examples merely for ease of understanding. A value of the pilot density is not limited in this application.

When the pilot density is less than 1, the second indication information may be used to indicate an RB to which the reference signal is mapped, in other words, indicate a reference signal RB.

In an implementation, the second indication information may directly indicate a number of the reference signal RB. For example, numbering is performed from 0 on a start RB pre-agreed on by the network device and the terminal device. The number of the reference signal RB is directly indicated to the terminal device by using the second indication information. Alternatively, the start RB may be predefined in a protocol. This is not limited in this application.

In another possible implementation, the protocol may predefine a formula used to determine a number of an RB including a reference signal RE. For example, the pilot density ½ may be determined by using a formula 2m+1 or 2m; and the pilot density ⅓ may be determined by using a formula 3m, 3m+1, or 3m+2. For brevity, examples are not listed one by one herein. m represents an $m^{th}$ reference signal RB counted from a predefined start position (for example, the start RB in the foregoing implementation), and m≥0 and is an integer.

In this implementation, the network device may indicate the foregoing formula by using the second indication information, or may indicate information, such as an identifier or an index corresponding to the formula, that may be used to uniquely indicate one formula. A specific manner for indicating the formula is not limited in this application.

It should be noted that the pilot density may be determined by using a formula, the second indication information may be understood as implicitly indicating the pilot density. In other words, the network device does not need to additionally indicate, by using the first indication information, the pilot density configured for each the transmit port.

In still another possible implementation, the protocol may predefine RBs to which a reference signal is mapped when values of pilot densities are different. For example, based on a pre-agreed start position (for example, the foregoing start RB), the protocol may predefine that when the pilot density is ½, the reference signal is mapped to an RB whose number is an odd number or an RB whose number is an even number; when the pilot density is ⅓, the reference signal is mapped to a specific RB in every three RBs, and so on. For brevity, examples are not listed one by one herein.

It should be understood that the foregoing listed manners for indicating the reference signal RB by using the second indication information are merely examples, and shall not constitute any limitation on this application. For a specific manner in which the network device indicates the reference signal RB by using the second indication information, refer to a method in a conventional technology. A specific manner for indicating the reference signal RB is not limited in this application.

It should be further understood that the first indication information and the second indication information are defined merely for ease of different functions, and shall not constitute any limitation on this application. For example, the first indication information and the second indication information may be carried in same signaling, for example, both are carried in DCI, or both may be pre-configured by using an RRC message and dynamically indicated by using DCI. The first indication information and the second indication information may alternatively be carried in different signaling. This is not limited in this application.

To reduce signaling overheads, the network device may further group transmit ports with same configurations into one port group, and indicate one or more configurations based on a granularity of the port group: a precoding resource bundling granularity, a subband size, and a pilot density.

As described above, the delay information may be a delay, or may be a group of delays (for example, including one or more delays having a same magnitude relationship) defined based on a magnitude relationship between a delay value and a predetermined value or a value of a reference delay.

When the delay information is defined based on the magnitude relationship between the delay value and the predetermined value or the value of the reference delay, a plurality of transmit ports have been naturally grouped. For example, one or more delays with a same magnitude relationship are defined as one piece of delay information, and one or more transmit ports associated with the one or more delays are defined as one port group. The delay information 1 and the delay information 2 in the foregoing description are used as examples. Because the delay information 1 is one or more delays whose values are greater than or equal to the predetermined value or the value of the reference delay, transmit ports associated with the one or more delays may be defined as one group. Because the delay information 2 is one or more delays whose values are less than the predetermined value or the value of the reference delay, transmit ports associated with the one or more delays may be defined as another port group.

Certainly, grouping may be performed not based on different delay information. For example, the delay information 1 to the delay information 4 are determined based on different magnitude relationships between delay values and the predetermined value or the value of the reference delay. The delay information 1 to the delay information 4 are arranged in descending order of values. The network device may group transmit ports associated with the four pieces of delay information at a larger granularity. For example, one or more transmit ports associated with the delay information 1 and the delay information 2 may be defined as one port group, and one or more transmit ports associated with the delay information 3 and the delay information 4 may be defined as another port group. For another example, one or more transmit ports associated with the delay information 1 may be defined as one port group, one or more transmit ports associated with the delay information 2 may be defined as another port group, and one or more transmit ports associated with the delay information 3 and the delay information 4 may be defined as still another port group. A port group division manner is not limited in this application.

In addition, the network device may directly group transmit ports based on values of delays. For example, transmit ports may be sorted in descending order of delay values, and then the plurality of transmit ports are evenly grouped. Alternatively, the plurality of transmit ports are grouped based on a degree of proximity of delay values.

For example, it is assumed that there are eight transmit ports, and port numbers are sequentially a port 0 to a port 7. Delays associated with the eight transmit ports are sorted in descending order. Delay values associated with the port 0 and a port 1 are close, delay values associated with a port 2 to a port 5 are close, and delay values associated with a port 6 and the port 7 are close.

If the eight the transmit ports are evenly grouped, for example, the port 0 to the port 3 may be grouped into one group, and the port 4 to the port 7 may be grouped into one group; or the port 0 and the port 1 may be grouped into one group, the port 2 and the port 3 may be grouped into one group, the port 4 and the port 5 may be grouped into one group, and the port 6 and the port 7 may be grouped into one group.

If the eight transmit ports are grouped based on a degree of proximity of delay values, for example, the port 0 and the port 1 may be grouped into one group, the port 2 to the port 5 may be grouped into one group, and the port 6 and the port 7 may be grouped into one group.

It should be understood that, for ease of understanding, the foregoing describes several possible port grouping manners. However, this shall not constitute any limitation on this application. The behavior of the network device for grouping ports is an internal implementation behavior of the device, and may be implemented based on different pre-configured grouping rules. A specific manner in which the network device groups ports is not limited in this application.

If the network device groups the transmit ports, when a configuration corresponding to each transmit port of the downlink reference signal is indicated by using the first indication information, the indication may be performed by using a port group as a unit. For example, configurations corresponding to a plurality of port groups are indicated by using a plurality of information elements. A specific indication manner may be the same as that described above. For brevity, details are not repeated herein again.

In addition, the network device may further indicate a correspondence between a port group and a transmit port. For example, an indication of a correspondence between a port group and a transmit port may be added to the first indication information. In an implementation, the network device indicates, in the first indication information, a port number of a transmit port included in each port group. In another implementation, the network device and the terminal device may agree on correspondences between a plurality of possible port grouping manners and indexes in advance, and indicate a currently used grouping manner by using the first indication information. In the first indication information, configurations associated with all port groups may be indicated in a predefined order, for example, in ascending order of port group numbers or descending order of port group numbers.

The following table shows an example of a correspondence between an index and a port grouping manner.

| Index | Port grouping manner |
| --- | --- |
| 0 | [port 0, port 1], [port 2, port 3], [port 4, port 5], and [port 6, port 7] |
| 1 | [port 0, port 1, port 2], [port 3, port 4, port 5], and [port 6, port 7] |
| 2 | [port 0, port 1, port 2], [port 3, port 4], and [port 5, port 6, port 7] |
| 3 | [port 0, port 1, port 2, port 3] and [port 4, port 5, port 6, port 7] |

It should be understood that the correspondence between an index and a port grouping manner shown in the foregoing table is merely an example for ease of understanding, and shall not constitute any limitation on this application. As described above, a specific port grouping manner is not limited in this application. In addition, a correspondence between an index and a port grouping manner does not necessarily need to be represented by using a table. A specific expression form of the correspondence between an index and a port grouping manner is not limited in this application either.

It should be further understood that the foregoing example implementation illustrating the correspondence between a port group and a transmit port is merely for ease of understanding, and shall not constitute any limitation on this application.

In addition, the network device does not necessarily need to carry the indication of the correspondence between a port group and a transmit port by using the first indication information, and the network device may carry the indication by using other signaling. This is not limited in this application.

In step 330, the network device sends the first indication information to the terminal device. Correspondingly, in step 330, the terminal device receives the first indication information from the network device.

As described above, the network device may carry the first indication information by using one or more of the RRC message, the MAC CE, and the DCI. For a specific implementation in which the network device sends information by using the RRC message, the MAC CE, and the DCI, refer to the conventional technology. For brevity, details are not described herein.

Optionally, the method further includes step 340: The network device sends second indication information to the terminal device. Correspondingly, in step 340, the terminal device receives the second indication information from the network device.

As described above, the second indication information and the first indication information may be carried in same signaling for sending. In this case, the sending steps of step 330 and step 340 may be combined into one step during performing. The second indication information and the first indication information are separately carried in different signaling for sending. In this case, step 330 and step 340 may be performed as two independent steps.

Optionally, the method further includes step 350: The network device sends a downlink reference signal to the terminal device. Correspondingly, in step 350, the terminal device receives the downlink reference signal from the network device.

As described above, the downlink reference signal sent by the network device is a reference signal obtained after precoding is performed based on the delay vector and the angle vector. It may be understood based on a relationship between an angle-delay pair and delay information that each transmit port of the downlink reference signal may be associated with one angle-delay pair or one delay vector.

For example, the network device may precode a reference signal based on, for example, L delay vectors and K angle vectors, to obtain reference signals corresponding to P transmit ports. Herein, L≥1, and K≥1. In an implementation, P=K×L, and P>1. L, K, and P are integers.

For ease of understanding, in the following description, it is assumed that a $p^{th}$ transmit port in P transmit ports is associated with an $l^{th}$ delay vector in the L delay vectors and a $k^{th}$ angle vector in the K angle vectors. 0≤p≤P−1, 0≤l≤L−1, 0≤k≤K−1, and p, k, and/are integers.

For example, a weighting coefficient corresponding to the $p^{th}$ transmit port and mentioned below may be understood a weighting coefficient corresponding to the $k^{th}$ angle vector and the $l^{th}$ delay vector, that is, a weighting coefficient corresponding to an angle-delay pair including the $k^{th}$ angle vector and the $l^{th}$ delay vector. For brevity, examples are not listed one by one herein.

The terminal device may receive the downlink reference signal based on the configuration corresponding to each transmit port of the downlink reference signal indicated in the first indication information. For a specific process in which the terminal device receives the downlink reference signal, refer to the conventional technology. For brevity, details are not described in this application.

It should be understood that an execution sequence of step 350 and step 310 to step 340 is not limited in this application. For example, step 340 may be performed before any one of step 310 to step 340, may be performed simultaneously with any one of step 310 to step 340, or may be performed after step 340.

It should be further understood that when step 330 and step 340 are two different steps, a sequence of performing step 330 and step 340 is not limited in this application either. For example, step 330 may be performed before step 340, or may be performed after step 340.

In step 360, the terminal device performs channel estimation based on the received downlink reference signal and the first indication information.

Because a transmit port that can be identified by the terminal device is a port corresponding to a reference signal, the terminal device may perform channel estimation based on a received reference signal of each transmit port to obtain a channel estimation value. Optionally, the channel estimation value may be specifically an equivalent channel obtained by performing channel estimation based on a received precoded reference signal, that is, a channel to which precoding is loaded.

In this embodiment of this application, the terminal device may feed back a channel measurement result based on each receive antenna. Therefore, for ease of understanding, a specific process of performing channel estimation by the terminal device is described below by using one receive antenna of the terminal device as an example. For one receive antenna of the terminal device, the terminal device may perform channel estimation based on a reference signal that is received on an $n^{th}$ RB in N RBs and that corresponds to a $p^{th}$ transmit port in P transmit ports. A channel estimation value obtained through estimation may be expressed as $y_n^{(p)}$, where $P \geq 1$ and $0 \leq p \leq P-1$.

In this embodiment of this application, because configurations corresponding to various transmit ports may be different, the terminal device may receive reference signals of the transmit ports based on different configurations, and perform channel estimation. Because a specific process of performing channel estimation by the terminal device is described below with reference to different configurations, details are not described herein for brevity.

Optionally, the method further includes step 370: The terminal device performs channel measurement based on a channel estimation value corresponding to each transmit port, and generates third indication information, where the third indication information is used to indicate a weighting coefficient corresponding to each transmit port.

As described above, each transmit port of the downlink reference signal is associated with one angle-delay pair. A downlink reference signal of each transmit port may be obtained based on the associated angle vector and delay vector. A weighting coefficient that is determined by the terminal device based on channel measurement and that corresponds to each sending port is a weighting coefficient corresponding to each angle-delay pair. Each angle-delay pair and a corresponding weighting coefficient may be used by the network device to reconstruct a downlink channel, to determine a precoding matrix adapted to the downlink channel.

Specifically, one receive antenna of the terminal device is still used as an example. The terminal device may determine, by summing channel estimation values on a plurality of reference signal RBs of a same transmit port, a weighting coefficient corresponding to each angle-delay pair. It is assumed that a pilot density is 1. In this case, a weighting coefficient corresponding to the $p^{th}$ transmit port in the P transmit ports may be determined by, for example, $$\sum_{n=0}^{N-1} y_n^{(p)}.$$

Because of the correspondence between a transmit port and an angle-vector pair, the weighting coefficient is also a weighting coefficient corresponding to the angle-delay pair. For example, the $p^{th}$ transmit port corresponds to the $l^{th}$ delay vector in the L delay vectors and the $k^{th}$ angle vector in the K angle vectors, and the weighting coefficient corresponding to the $l^{th}$ delay vector and the $k^{th}$ angle vector may be determined by $$\sum_{n=0}^{N-1} y_n^{(p)}.$$

In this embodiment of this application, the configuration corresponding to the transmit port includes one or more of a precoding resource bundling granularity, a subband size, and a pilot density. The following describes a specific process in which the terminal device performs channel estimation and channel measurement with reference to the foregoing items.

If the configuration corresponding to the transmit port includes the precoding resource bundling granularity, that is, PRGs with different granularities may be configured for different transmit ports, the terminal device may perform channel estimation based on the PRGs with different granularities. For ease of understanding, it is first assumed herein that the pilot density is 1.

FIG. 4 is still used as an example. The PRG granularity shown in FIG. 4 is 2, that is, each PRG includes two RBs. That is, phase rotation angles on two RBs in a same PRG are the same, and equivalent channels in the PRG are consecutive. Therefore, the terminal device may perform channel estimation by bundling the two RBs together.

In an implementation, the terminal device may estimate, based on a reference signal received on each RB, an equivalent channel received on each RB; and then, filter channel estimation values on a plurality of RBs in one PRG by using a PRG as a unit, to perform noise reduction processing on channel estimation values on each RB, so as to obtain a more accurate channel estimation value.

A specific filtering manner may be implemented, for example, by respectively multiplying channel estimation values on a plurality of RBs in a same PRG by corresponding filtering coefficients. The filtering coefficients may be generated based on frequency domain correlations between the RBs. Because the frequency domain correlations between the RBs are considered, a channel estimation value obtained after frequency domain filtering is more accurate. Alternatively, a specific filtering manner may be implemented, for example, by averaging channel estimation values on a plurality of RBs. The foregoing process may also be implemented in time domain. For example, windowing processing is performed on a time domain signal based on a designed filtering window to achieve a noise reduction effect.

In another implementation, the terminal device may estimate, based on a reference signal received on each RB, an equivalent channel received on each RB; and then, perform frequency domain linear interpolation on channel estimation values on a plurality of RBs in one PRG by using a PRG as a unit, to obtain a channel estimation value on each RB.

For ease of differentiation and understanding, a channel estimation value obtained by performing channel estimation based on a plurality of RBs bundled in one PRB is denoted as $z_n^{(p)}$ herein.

It should be understood that the foregoing specific implementation of performing channel estimation based on a plurality of RBs bundled in one PRB is merely an example, and shall not constitute any limitation on this application. For a specific manner of performing channel estimation based on a plurality of bundled RBs, refer to the conventional technology. For brevity, details are not described herein.

The terminal device may further perform full-band accumulation based on channel estimation values obtained by bundling a plurality of RBs, to obtain a weighting coefficient corresponding to each transmit port. For example, a weighting coefficient corresponding to the $p^{th}$ transmit port is $$\sum_{n=0}^{N-1} z_n^{(p)}.$$

If a configuration corresponding to a transmit port includes a subband size, it may be considered that a PRG granularity configured for the transmit port is the subband size, and the terminal device may perform channel estimation in the foregoing manner.

If a configuration corresponding to a transmit port includes a pilot density, that is, different pilot densities may be configured for different transmit ports, the terminal device may perform channel estimation based on the different pilot densities.

For example, when the pilot density is greater than 1, that is, each RB includes more than one reference signal RE, the terminal device may obtain a plurality of channel estimation values based on a reference signal received on one RB. When the pilot density is less than 1, that is, there is one reference signal RB in a plurality of RBs, the terminal device may obtain a plurality of channel estimation values based on reference signals received on the reference signal RBs. It may be understood that a quantity of channel estimation values obtained when the pilot density is greater than 1 is greater than that obtained when the pilot density is less than 1. A result obtained by performing channel measurement based on more channel estimation values is more accurate.

For example, when the pilot density is 2, that is, each RB may include two reference signal REs, the terminal device may obtain two channel estimation values based on a reference signal received on one RB and corresponding to a transmit port. For example, two channel estimation values obtained based on a reference signal that corresponds to the $p^{th}$ transmit port and that is received on the $n^{th}$ RB are denoted as $s_{2n+0}^{(p)}$ and $s_{2n+1}^{(p)}$.

For example, when the pilot density is ½, that is, every two RBs include one reference signal RB, the terminal device may obtain one channel estimation value based on reference signals received on one reference signal RB and corresponding to a transmit port. For example, one channel estimation value obtained based on a reference signal that corresponds to the $p^{th}$ transmit port and that is received on the $n^{th}$ RB is denoted as $s_m^{(p)}$. m=0, 1, . . . , or M−1, and M=⌈N/2⌉.

The terminal device may further perform full-band accumulation based on channel estimation values obtained based on a reference signal received on each RB, to obtain a weighting coefficient corresponding to each transmit port.

For example, if the pilot density is 2, a result of performing full-band accumulation may be determined by, for example $$\sum_{n=0}^{N-1} \left(s_{2n+0}^{(p)} + s_{2n+1}^{(p)}\right).$$

For another example, if the pilot density is ½, a result of performing full-band accumulation may be determined by, for example $$\sum_{m=0}^{M-1} s_m^{(p)}.$$

In other words, if the pilot density is greater than 1, a result of performing full-band accumulation may be determined by, for example $$\sum_{n=0}^{N-1} \left(s_{dn+0}^{(p)} + \ldots + s_{dn+d-1}^{(p)}\right),$$

where d is the pilot density. If the pilot density is less than 1, a result of performing full-band accumulation may be determined by, for example $$\sum_{m=0}^{M-1} s_m^{(p)},$$

where M is a quantity of reference signal RBs.

In this way, the terminal device may determine the weighting coefficient corresponding to each transmit port.

It should be understood that the foregoing description is merely for ease of understanding, a process of how the terminal device performs channel estimation and channel measurement to obtain the be-fed-back weighting coefficient corresponding to each transmit port when the configuration corresponding to the transmit port is any one of the precoding resource bundling granularity, the subband size, and the pilot density is described in detail. However, this shall not constitute any limitation on this application.

As described above, the plurality of foregoing configurations may be used in combination. For example, a precoding resource bundling granularity corresponding to a transmit port is configured as 8, a subband size is 8 RBs, and a pilot density is configured as 0.5. For another example, a precoding resource bundling granularity corresponding to a transmit port is configured as 2, a subband size is two RBs, and a pilot density is configured as 2. For brevity, examples are not listed one by one herein. It should be understood that the foregoing listed combinations of the precoding resource bundling granularity, the subband size, and the pilot density and specific values are merely examples for ease of understanding, and shall not constitute any limitation on this application.

When a plurality of configurations are combined, the terminal device may still perform channel estimation and channel measurement based on a method similar to that described above.

It is assumed that a precoding resource bundling granularity corresponding to the $p^{th}$ transmit port is 8 and a pilot density is 0.5.

The terminal device first performs channel estimation based on a reference signal received on each reference signal RB, to obtain a channel estimation value corresponding to each reference signal RB. Then, the terminal device may perform, by using a PRG as a unit, filtering or interpolation on channel estimation values corresponding to eight RBs in one PRG. It may be understood that because the pilot density is 0.5, only four RBs in eight RBs in one PRG are reference signal RBs. Therefore, one PRG corresponds to four channel estimation values. After filtering or interpolation, four processed channel estimation values can still be obtained. The terminal device may further perform full-band accumulation on channel estimation values corresponding to a plurality of PRGs to determine the weighting coefficient corresponding to the $p^{th}$ transmit port.

It is further assumed that a precoding resource bundling granularity corresponding to the $p^{th}$ transmit port is 2 and a pilot density is 2.

The terminal device first performs channel estimation based on a reference signal received on each RB, to obtain a channel estimation value corresponding to each RB. Then, the terminal device may perform, by using a PRG as a unit, filtering or interpolation on channel estimation values corresponding to two RBs in one PRB. It may be understood that because the pilot density is 2 and one RB corresponds to two channel estimation values, one PRG corresponds to four channel estimation values. The terminal device may perform filtering or interpolation on the four channel estimation values, and four processed channel estimation values can still be obtained. The terminal device may further perform full-band accumulation on channel estimation values corresponding to a plurality of PRGs to determine the weighting coefficient corresponding to the $p^{th}$ transmit port.

Based on a manner same as that described above, the terminal device may determine the weighting coefficient corresponding to each transmit port.

It should be understood that the foregoing describes in detail, with reference to a plurality of examples, the specific processes in which the terminal device performs channel estimation and channel measurement. However, these specific processes are merely examples for ease of understanding, and shall not constitute any limitation on this application. A process in which the terminal device performs channel estimation and channel measurement is an internal implementation behavior of the device, and may be implemented by configuring different algorithms. A specific manner in which the terminal device performs channel estimation and channel measurement is not limited in this application.

After determining the weighting coefficient corresponding to each transmit port, the terminal device may generate third indication information, to indicate the weighting coefficient corresponding to each transmit port. The terminal device may indicate, by using, for example, quantization values, weighting coefficients corresponding to a plurality of transmit ports.

In a possible implementation, the terminal device may perform normalization processing on the weighting coefficient that is re determined by the terminal device and that corresponds to each transmit port. A unit for performing normalization processing by the terminal device may be, for example, one polarization direction and one receive antenna, may be two polarization directions and one receive antenna, or may be two polarization directions and R receive antennas. For example, when the unit of normalization processing is two polarization directions and R receive antennas, normalization processing is also equivalent to being performed within a range of all weighting coefficients determined by the terminal device. The unit of normalization processing is not limited in this application.

It should be understood that, for a specific process of performing normalization processing by the terminal device, refer to the conventional technology. For brevity, details are not described herein. The terminal device may sequentially indicate normalized weighting coefficients in a pre-agreed order, so that the network device performs interpretation in the same order to determine a correspondence between each weighting coefficient and a transmit port (or an angle-delay pair).

Optionally, the method further includes step 380: The terminal device sends third indication information to the network device, where the third indication information is used to indicate a weighting coefficient corresponding to each transmit port. Correspondingly, in step 380, the network device receives the third indication information from the terminal device.

Specifically, the terminal device may send the third indication information to the network device by using a pre-allocated physical uplink resource, for example, a physical uplink control channel (PUCCH) or a physical uplink shared channel (PUSCH). For example, the third indication information may be carried in a CSI report, or may be carried in other existing or newly added signaling. Specific signaling used to carry the third indication information is not limited in this application.

It should be understood that, for a specific process in which the terminal device sends the third indication information by using the physical uplink resource, refer to the conventional technology. For brevity, detailed descriptions of the specific process are omitted herein.

Optionally, the method further includes step 390: The network device determines a precoding matrix based on the third indication information.

As described above, the terminal device feeds back the weighting coefficient based on the receive antenna. In this case, the weighting coefficient indicated by the third indication information may include weighting coefficients corresponding to one or more receive antennas. The network device may reconstruct a downlink channel based on a weighting coefficient corresponding to each receive antenna and an angle-delay pair corresponding to each weighting coefficient, to further determine a precoding matrix corresponding to each RB.

For example, it is assumed that a quantity of polarization directions of a transmit antenna is 2, spatial-frequency matrices corresponding to an $r^{th}$ (where $0 \leq r \leq R-1$, and r is an integer) receive antennas in R receive antennas may be determined by using the following calculation formula:

$$H_{DL}^{(r)} = \begin{bmatrix} \sum_{l=1}^{L}\sum_{k=1}^{K} \alpha_{k,l,1}^{(r)} a(\theta_k) \times b(\tau_l)^H \\ \sum_{l=1}^{L}\sum_{k=1}^{K} \alpha_{k,l,2}^{(r)} a(\theta_k) \times b(\tau_l)^H \end{bmatrix}.$$

$\alpha_{k,l,1}^{(r)}$ represents a weighting coefficient that is fed back based on the $r^{th}$ receive antenna and that corresponds to the $k^{th}$ angle vector and the $l^{th}$ delay vector in the first polarization direction; and $\alpha_{k,l,2}^{(r)}$ represents a weighting coefficient that is fed back based on the $r^{th}$ receive antenna and that corresponds to the $k^{th}$ angle vector and the $l^{th}$ delay vector in the second polarization direction. The weighting coefficient corresponding to the $k^{th}$ angle vector and the $l^{th}$ delay vector is the weighting coefficient corresponding to the $p^{th}$ transmit port.

It should be understood that, the foregoing calculation formula of the spatial-frequency matrix $H_{DL}^{(r)}$ that is defined for the two polarization directions is merely an example, and this shall not constitute any limitation on this application.

For example, quantities of delay vectors and/or angle vectors loaded in different polarization directions may be the same or may be different, and delay vectors and/or angle vectors loaded in different polarization directions may be the same or may be different.

For R receive antennas, the network device may determine spatial-frequency matrices $H_{DL}^{(0)}$ and $H_{DL}^{(1)}$ to $H_{DL}^{(R-1)}$ based on P weighting coefficients corresponding to each receive antenna. Therefore, the network device may determine a downlink channel matrix corresponding to each RB.

An $n^{th}$ RB in N RBs is used as an example. The network device may determine a conjugate transpose $(V^{(n)})^H$ of a downlink channel matrix corresponding to the $n^{th}$ RB. The matrix $(V^{(n)})^H$ may be determined by an $n^{th}$ column vector in each of the R spatial-frequency matrices $H_{DL}^{(0)}$ and $H_{DL}^{(1)}$ to $H_{DL}^{(R-1)}$ that are respectively determined based on the R receive antennas. For example, an $n^{th}$ column in $H_{DL}^{(0)}$ is used as a $0^{th}$ column in the matrix $(V^{(n)})^H$, and an $n^{th}$ column in $H_{DL}^{(1)}$ is used as the first column in the matrix $(V^{(n)})^H$; and by analogy, an $n^{th}$ column in $H_{DL}^{(r)}$ may be used as an $r^{th}$ column in the matrix $(V^{(n)})^H$. In this way, the matrix $(V^{(n)})^H$ can be obtained. Further, the downlink channel matrix $V^{(n)}$ corresponding to the $n^{th}$ RB can be determined. The downlink channel matrix corresponding to each RB may be determined based on the foregoing method.

It should be noted that, if the network device configures a different pilot density for each transmit port, the network device may perform normalization processing on the weighting coefficient based on the pilot density configured for each transmit port. Then, the normalized weighting coefficient is substituted into the foregoing calculation formula for $H_{DL}^{(r)}$ to calculate a spatial-frequency matrix corresponding to each receive antenna, thereby further determining a downlink channel matrix. Because a process in which the network device performs only normalization processing on the weighting coefficient is an internal implementation behavior of the device and may be implemented based on different pre-configured algorithms, a specific manner of performing normalization processing on the weighting coefficient by the network device is not limited in this application.

The network device may further determine the precoding matrix of each RB based on the downlink channel matrix of each RB. For example, the network device may determine the precoding matrix by performing SVD on the downlink channel matrix or a covariance matrix of the channel matrix, or may determine the precoding matrix by performing eigenvalue decomposition (EVD) on a covariance matrix of the downlink channel matrix.

It should be understood that, for a specific manner of determining the precoding matrix by the network device based on the channel matrix, refer to the conventional technology. A manner of determining the precoding matrix is not limited in this application.

It should be further understood that, merely for ease of understanding, the foregoing shows a specific process in which the network device determines the downlink channel matrix based on the spatial-frequency matrix, to further determine the precoding matrix. However, this shall not constitute any limitation on this application. Alternatively, the network device may directly determine the precoding matrix based on the spatial-frequency matrix.

It should be further understood that, the foregoing is merely an example, and shows a possible implementation in which the network device determines the precoding matrix based on the second indication information. However, this shall not constitute any limitation on this application. A specific implementation in which the network device determines the precoding matrix based on the second indication information is not limited in this application. Based on a same concept, a person skilled in the art performs transformation or equivalent replacement on the foregoing listed matrix operation, and a method for determining a precoding matrix shall fall within the protection scope of this application.

It should be further understood that, the precoding matrix determined above is a precoding matrix corresponding to an RB. The precoding matrix corresponding to the RB may be a precoding matrix determined at a granularity of a size of the RB based on a channel matrix corresponding to the RB, or a precoding matrix determined based on a precoded reference signal received on the RB, and may be used to precode data transmitted by using the RB. A downlink channel corresponding to the RB may be a downlink channel determined based on the precoded reference signal received on the RB, and may be used to determine the precoding matrix corresponding to the RB.

It should be understood that, merely for understanding and description, the foregoing uses the RB as an example of the frequency domain unit to describe in detail a specific process in which the network device restores the precoding matrix corresponding to the frequency domain unit. However, this shall not constitute any limitation on this application. As described above, the granularity of the frequency domain unit is not limited to the RB. When the granularity of the frequency domain unit is large, for example, when the frequency domain unit is a subband or a PRG, the network device may determine, based on a precoding matrix corresponding to each RB in each frequency domain unit, a precoding matrix corresponding to the frequency domain unit.

If each frequency domain unit includes one reference signal RB, the network device may use a precoding matrix corresponding to the RB as the precoding matrix corresponding to the frequency domain unit. If each frequency domain unit includes a plurality of reference signal RBs, the network device may perform, for example, SVD after averaging correlation matrices of precoding matrices corresponding to a plurality of RBs in a same frequency domain unit, to determine a precoding matrix corresponding to the frequency domain unit. For another example, the network device may use an average of precoding matrices corresponding to a plurality of RBs in a same frequency domain unit as a precoding matrix corresponding to the frequency domain unit.

It should be understood that, for a specific method for determining, by the network device, the precoding matrix of the frequency domain unit based on the precoding matrices corresponding to the plurality of RBs in the frequency domain unit, refer to the technology, and the method is not limited to the foregoing listed method. A specific method for determining, by the network device, the precoding matrix for the frequency domain unit based on the precoding matrices corresponding to the plurality of RBs in the frequency domain unit is not limited in this application.

Based on the foregoing technical solution, the network device may configure a precoding resource bundling granularity, a subband size, or a pilot granularity based on different delay information. Because transmit ports associated with different delay information may be configured with different precoding resource bundling granularities, subband sizes, or pilot granularities, the network device can select a proper configuration for each transmit port based on a change status of a channel in frequency domain. The terminal device may perform channel estimation based on the precoding resource bundling granularity, the subband size, or the pilot granularity configured by the network device for each transmit port. For example, when a large precoding resource bundling granularity is configured, channel estimation may be performed based on reference signals received on a plurality of RBs, to obtain a more accurate channel estimation value and a more accurate channel measurement result. For another example, when a large pilot density is configured, a plurality of channel estimation values may be estimated based on a reference signal received on one RB, to obtain a more accurate channel measurement result. In this way, the network device may reconstruct the downlink channel based on the more accurate channel measurement result, and further determine, for downlink data transmission, a precoding matrix adapted to the downlink channel. Therefore, transmission performance of the system is improved.

It should be understood that, in this embodiment of this application, merely for ease of understanding, a specific process of performing downlink channel measurement and determining the precoding matrix when the spatial-frequency matrix is obtained based on a conjugate transpose of an actual channel is shown. However, this shall not constitute any limitation on this application. A relationship between the actual channel and the spatial-frequency matrix $H_{DL}$ is not fixed. Different definitions of the spatial-frequency matrix and the spatial-frequency component matrix may change the relationship between the actual channel and the spatial-frequency matrix $H_{DL}$. For example, the spatial-frequency matrix $H_{DL}$ may be obtained based on the conjugate transpose of the actual channel, or may be obtained based on a transpose of the actual channel.

When a relationship between the spatial-frequency matrix and the channel matrix is defined differently, operations performed by the network device when the delay and the angle are loaded are also different, and operations performed by the terminal device when the terminal device performs channel measurement and provides a feedback correspondingly change. However, these are only implementation behaviors of the terminal device and the network device, and this shall not constitute any limitation on this application. The definition of the channel matrix, the dimensions and the definition of the spatial-frequency matrix, and a transformation relationship between the channel matrix and the spatial-frequency matrix are not limited in this application. Similarly, a transformation relationship between the spatial-frequency matrix and the precoding matrix is not limited in this application either.

It should be further understood that in the method embodiment provided above, the process in which the terminal device performs channel measurement and the network device determines the precoding matrix is described in detail by using an example in which the terminal device performs feedback based on the receive port. However, this shall not constitute any limitation on this application. The terminal device may alternatively feed back a channel measurement result based on a transport layer. In this case, for example, the terminal device may perform further processing, for example, SVD, on the weighting coefficient that is determined based on each receive port and that corresponds to each transmit port, to obtain a feedback based on the transport layer. The network device may directly determine the precoding matrix based on the spatial-frequency matrix determined by the feedback of the terminal device. This process is similar to the process described above. For brevity, details are not described in this embodiment of this application. It should be further understood that, for ease of understanding only the method provided in this application, the foregoing describes in detail the process of channel measurement, the process of reconstructing the downlink channel by the network device, and the process of determining the precoding matrix. However, this shall not constitute any limitation on this application. A solution in which the network device performs a different configuration for each transmit port based on the delay information is not limited to this scenario. A scenario to which the method is applicable is not limited in this application.

It should be further understood that, in the foregoing embodiments, the terminal device and/or the network device may perform some or all of the steps in the embodiments. These steps or operations are merely examples. In the embodiments of this application, other operations or variations of various operations may be performed. In addition, the steps may be performed in an order different from that presented in the embodiments, and it is possible that not all operations in the embodiments of this application need to be performed. In addition, a sequence number of each step does not mean an execution sequence. The execution sequence of each process should be determined based on a function and internal logic of the process, and shall not constitute any limitation on the implementation process of the embodiments of this application.

Figure 5:
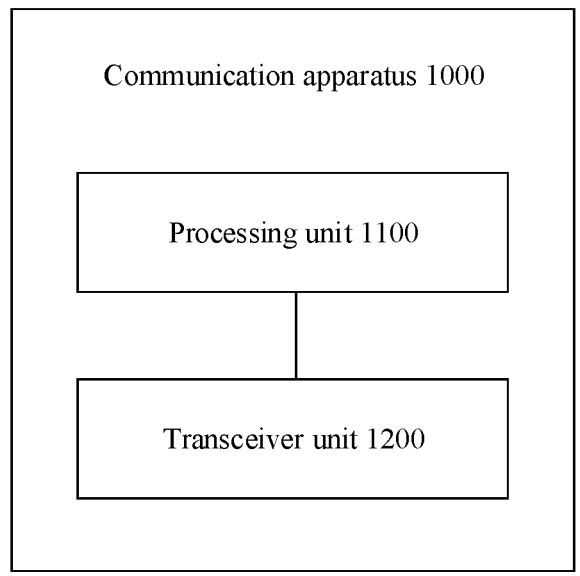
FIG. 5 is a schematic block diagram of a communication apparatus according to an embodiment of this application.

FIG. 5 is a schematic block diagram of a communication apparatus according to an embodiment of this application. As shown in FIG. 5, the communication apparatus 1000 may include a processing unit 1100 and a transceiver unit 1200.

In a possible design, the communication apparatus 1000 may correspond to the terminal device in the foregoing method embodiments, for example, may be the terminal device or a component (such as a chip or a chip system) configured in the terminal device.

It should be understood that the communication apparatus 1000 may correspond to the terminal device in the method 300 according to the embodiment of this application. The communication apparatus 1000 may include units configured to perform the method performed by the terminal device in the method 300 in FIG. 3. In addition, the units in the communication apparatus 1000 and the foregoing other operations and/or functions are separately used to implement corresponding procedures of the method 300 in FIG. 3.

When the communication apparatus 1000 is configured to perform the method 300 in FIG. 3, the processing unit 1100 may be configured to perform step 360 and step 370 in the method 300, and the transceiver unit 1200 may be configured to perform steps 330 to 350 and step 380 in the method 300. It should be understood that, a specific process in which each unit performs the foregoing corresponding step has been described in detail in the foregoing method embodiments. For brevity, details are not described herein again.

It should be further understood that, when the communication apparatus 1000 is the terminal device, the transceiver unit 1200 in the communication apparatus 1000 may be implemented via a transceiver. The transceiver may correspond to a transceiver 2020 in the terminal device 2000 shown in FIG. 6. The processing unit 1100 in the communication apparatus 1000 may be implemented by using at least one processor. The processor may correspond to a processor 2010 in the terminal device 2000 shown in FIG. 6.

It should be further understood that when the communication apparatus 1000 is a chip configured in the terminal device, the transceiver unit 1200 in the communication apparatus 1000 may be implemented by using an input/output interface. The processing unit 1100 in the communication apparatus 1000 may be implemented by using a processor, a microprocessor, an integrated circuit, or the like integrated into the chip or a chip system.

In another possible design, the communication apparatus 1000 may correspond to the network device in the foregoing method embodiments, for example, may be the network device or a component (such as a chip or a chip system) configured in the network device.

It should be understood that the communication apparatus 1000 may correspond to the network device in the method 300 according to the embodiment of this application, and the communication apparatus 1000 may include units configured to perform the method performed by the network device in the method 300 in FIG. 3. In addition, the units in the communication apparatus 1000 and the foregoing other operations and/or functions are separately used to implement corresponding procedures of the method 300 in FIG. 3.

When the communication apparatus 1000 is configured to perform the method 300 in FIG. 3, the processing unit 1100 may be configured to perform step 310, step 330, and step 390 in the method 300, and the transceiver unit 1200 may be configured to perform step 330 to step 350 and step 380 in the method 300. It should be understood that, a specific process in which each unit performs the foregoing corresponding step has been described in detail in the foregoing method embodiments. For brevity, details are not described herein again.

Figure 7:
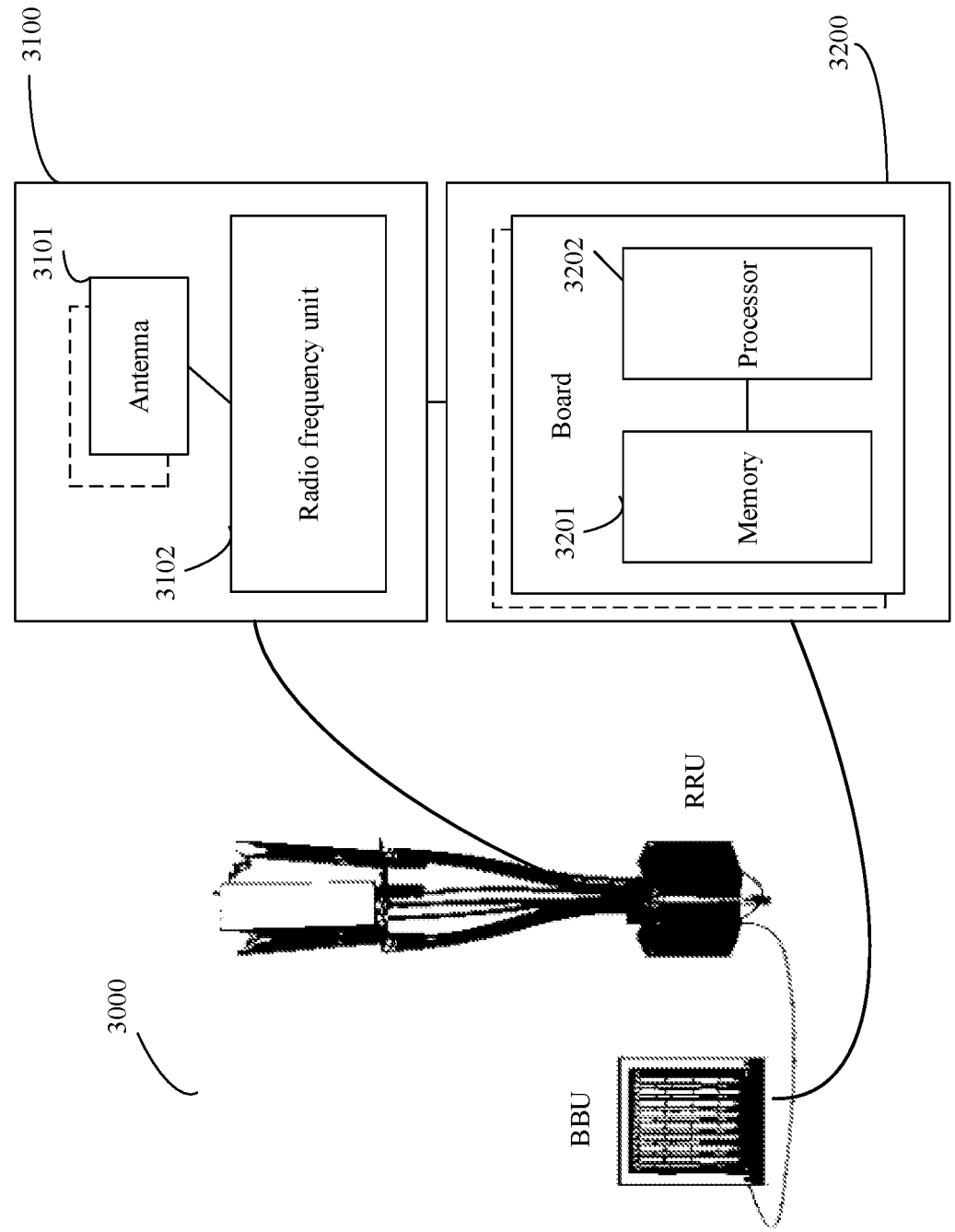
FIG. 7 is a schematic diagram of a structure of a network device according to an embodiment of this application.

It should be further understood that when the communication apparatus 1000 is the network device, the transceiver unit in the communication apparatus 1000 shown in FIG. 5 may be implemented by using a transceiver, for example, may correspond to the transceiver 3100 in the network device 3000 shown in FIG. 7; and the processing unit 1100 in the communication apparatus 1000 shown in FIG. 5 may be implemented by using at least one processor, for example, may correspond to the processor 3200 in the network device 3000 shown in FIG. 7.

It should be further understood that when the communication apparatus 1000 is a chip configured in the network device, the transceiver unit 1200 in the communication apparatus 1000 may be implemented by using an input/output interface. The processing unit 1100 in the communication apparatus 1000 may be implemented by using a processor, a microprocessor, an integrated circuit, or the like integrated into the chip or a chip system.

Figure 6:
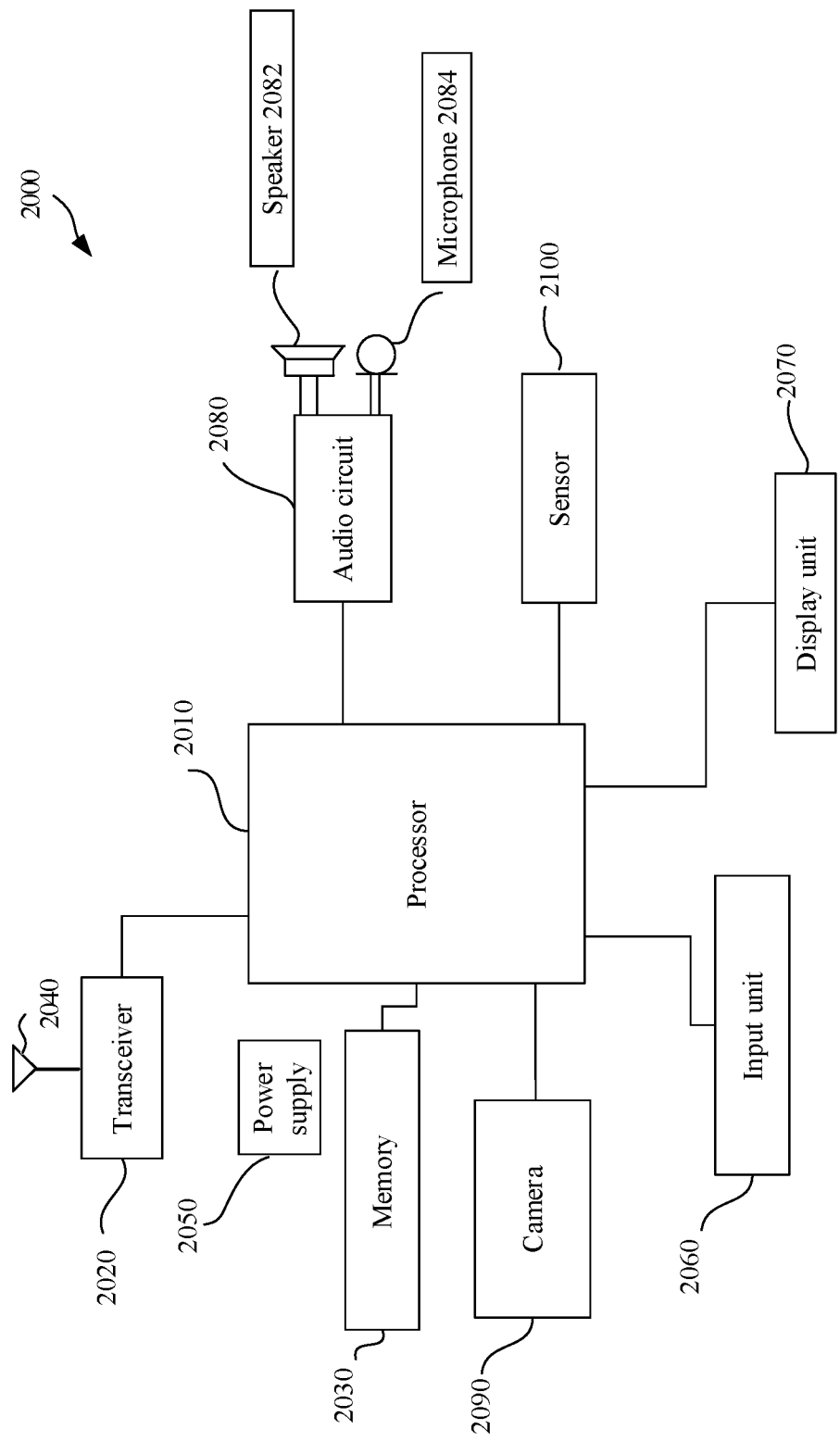
FIG. 6 is a schematic diagram of a structure of a terminal device according to an embodiment of this application.

FIG. 6 is a schematic structural diagram of the terminal device 2000 according to an embodiment of this application. The terminal device 2000 may be used in the system shown in FIG. 1, to perform a function of the terminal device in the foregoing method embodiments. As shown in the figure, the terminal device 2000 includes a processor 2010 and a transceiver 2020. Optionally, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit 1100 in FIG. 5.

The transceiver 2020 may correspond to the transceiver unit 1200 in FIG. 5. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the terminal device 2000 shown in FIG. 6 can implement the processes related to the terminal device in the method embodiment shown in FIG. 3. The operations and/or the functions of the modules in the terminal device 2000 are separately intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of receiving or sending that is performed by the terminal device from or to the network device and that is described in the foregoing method embodiments. For details, refer to the descriptions in the foregoing method embodiments. Details are not described herein again.

Optionally, the terminal device 2000 may further include a power supply 2050, configured to supply power to various devices or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 7 is a schematic diagram of a structure of a network device according to an embodiment of this application, for example, a schematic diagram of a structure of a base station. The base station 3000 may be used in the system shown in FIG. 1, to perform a function of the network device in the foregoing method embodiments. As shown in the figure, the base station 3000 may include one or more radio frequency units such as remote radio units (remote radio unit, RRU) 3100 and one or more baseband units (BBU) (which may also be referred to as distributed units (DU)) 3200. The RRU 3100 may be referred to as a transceiver unit, and corresponds to the transceiver unit 1200 in FIG. 5. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The RRU 3100 is mainly configured to: receive and send a radio frequency signal, and perform conversion between the radio frequency signal and a baseband signal. For example, the RRU 3100 is configured to send indication information to a terminal device. The BBU 3200 is mainly configured to perform baseband processing, control the base station, and so on. The RRU 3100 and the BBU 3200 may be physically disposed together, or may be physically disposed separately, that is, the base station is a distributed base station.

The BBU 3200 is a control center of the base station, and may also be referred to as a processing unit. The BBU may correspond to the processing unit 1100 in FIG. 5, and is mainly configured to implement a baseband processing function, for example, channel coding, multiplexing, modulation, or spreading. For example, the BBU (the processing unit) may be configured to control the base station to perform an operation procedure related to the network device in the foregoing method embodiments, for example, to generate the foregoing indication information.

In an example, the BBU 3200 may include one or more boards. A plurality of boards may jointly support a radio access network (for example, an LTE network) with a single radio access technology, or may separately support radio access networks (for example, the LTE network, a 5G network, or another network) with different radio access technologies. The BBU 3200 further includes a memory 3201 and a processor 3202. The memory 3201 is configured to store necessary instructions and data. The processor 3202 is configured to control the base station to perform a necessary action, for example, is configured to control the base station to perform the operation procedure related to the network device in the foregoing method embodiments. The memory 3201 and the processor 3202 may serve one or more boards. In other words, a memory and a processor may be independently disposed on each board, or a plurality of boards may share a same memory and a same processor. In addition, a necessary circuit may be further disposed on each board.

It should be understood that, the base station 3000 shown in FIG. 7 can implement processes related to the network device in the method embodiment in FIG. 3. The operations and/or the functions of the modules in the base station 3000 are separately intended to implement corresponding procedures in the foregoing method embodiments. For details, refer to the descriptions in the foregoing method embodiments. To avoid repetition, detailed descriptions are properly omitted herein.

The BBU 3200 may be configured to perform an action implemented inside the network device in the foregoing method embodiments, and the RRU 3100 may be configured to perform an action of receiving or sending that is performed by the terminal device from or to the network device and that is described in the foregoing method embodiments. For details, refer to the descriptions in the foregoing method embodiments. Details are not described herein again.

It should be understood that the base station 3000 shown in FIG. 7 is merely a possible form of the network device, and shall not constitute any limitation on this application. The method provided in this application may be applicable to a network device in another form, for example, an AAU, a CU and/or a DU, a BBU and an adaptive radio unit (ARU), a BBU, customer premises equipment (CPE), or a device in another form. A specific form of the network device is not limited in this application.

The CU and/or DU may be configured to perform an action that is implemented inside the network device and that is described in the foregoing method embodiments, and the AAU may be configured to perform an action of receiving or sending that is performed by the network device from or to the terminal device and that is described in the foregoing method embodiments. For details, refer to the descriptions in the foregoing method embodiments. Details are not described herein again.

An embodiment of this application further provides a processing apparatus, including a processor and an interface. The processor is configured to perform the method in any one of the foregoing method embodiments.

It should be understood that, the processing apparatus may be one or more chips. For example, the processing apparatus may be a field programmable gate array (FPGA), a dedicated integrated chip (application-specific integrated circuit, ASIC), a system on chip (SoC), a central processing unit (CPU), a network processor (NP), a digital signal processing circuit (digital signal processor, DSP), a micro controller unit (MCU), a programmable controller (programmable logic device, PLD), or another integrated chip.

In an implementation process, the steps in the foregoing methods can be completed by using a hardware integrated logic circuit in the processor, or by using instructions in a form of software. The steps in the methods disclosed with reference to the embodiments of this application may be directly performed and completed by a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor. To avoid repetition, details are not described herein again.

It should be noted that the processor in the embodiments of this application may be an integrated circuit chip, and has a signal processing capability. In an implementation process, the steps in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and the logical block diagrams that are disclosed in the embodiments of this application. The general-purpose processor may be a microprocessor, or the processor may be any conventional processor or the like. The steps in the methods disclosed with reference to the embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

It may be understood that, in the embodiments of this application, the memory may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through examples but not limitative descriptions, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct Rambus random access memory (direct Rambus RAM, DR RAM). It should be noted that the memories in the systems and methods described in this specification include but are not limited to these memories and any memory of another suitable type.

According to the method provided in the embodiments of this application, this application further provides a computer program product. The computer program product includes computer program code. When the computer program code is run on a computer, the computer is enabled to perform the methods separately performed by the terminal device and the network device in the embodiment shown in FIG. 3.

According to the method provided in the embodiments of this application, this application further provides a computer-readable medium. The computer-readable medium stores program code. When the program code is run on a computer, the computer is enabled to perform the methods separately performed by the terminal device and the network device in the embodiment shown in FIG. 3.

According to the method provided in the embodiments of this application, this application further provides a system. The system includes the foregoing one or more terminal devices and the foregoing one or more network devices.

The network device and the terminal device in the foregoing apparatus embodiments completely correspond to the network device and the terminal device in the method embodiments. A corresponding module or unit performs a corresponding step. For example, the communication unit (transceiver) performs a receiving or sending step in the method embodiments, and a step other than the sending step and the receiving step may be performed by the processing unit (processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As shown in the figures, both a computing device and an application that runs on the computing device may be components. One or more components may reside in a process and/or an execution thread, and a component may be located on one computer and/or distributed between two or more computers. In addition, these components may be executed on various computer-readable media that store various data structures. The components may communicate with each other by using a local and/or remote process and based on, for example, a signal having one or more data packets (for example, data from two components interacting with another component in a local system, a distributed system, and/or across a network such as the internet interacting with another system by using a signal).

A person of ordinary skill in the art may be aware that, various illustrative logical blocks and steps that are described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units are integrated into one unit.

In the foregoing embodiments, all or some of the functions of the functional units may be implemented by software, hardware, firmware, or any combination thereof. When software is used to implement the embodiments, all or some of the embodiments may be implemented in a form of a computer program product. The computer program product includes one or more computer instructions (programs). When the computer program instructions (programs) are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state disk (SSD)), or the like.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for configuring a transmit port of a downlink reference signal, comprising:
receiving first indication information from a network device, wherein the first indication information indicates configurations corresponding to a plurality of transmit ports, wherein each of the plurality of transmit ports is associated with one piece of delay information, wherein transmit ports associated with same delay information correspond to a same configuration, wherein at least two transmit ports associated with different delay information correspond to different configurations based on a correlation between the delay information of the transmit ports and the configurations indicated by the first indication information, and wherein each of the configurations indicated by the first indication information comprises at least one of the following: a precoding resource bundling granularity, a subband size, or a pilot density;
receiving, based on the configurations indicated by the first indication information, downlink reference signals sent by the plurality of transmit ports; and
performing channel estimation.

2. The method according to claim 1, wherein that at least two transmit ports associated with different delay information correspond to different configurations based on a correlation between the delay information of the transmit ports and the configurations indicated by the first indication information comprises:
when each of the configurations indicated by the first indication information is the precoding resource bundling granularity, a transmit port with a larger delay value corresponds to a smaller precoding resource bundling granularity;
when each of the configurations indicated by the first indication information is the subband size, a transmit port with a larger delay value corresponds to a smaller subband size; or
when each of the configurations indicated by the first indication information is the pilot density, a transmit port with a larger delay value corresponds to a larger pilot density.

3. The method according to claim 2, wherein when each of the configurations indicated by the first indication information is the pilot density and when the pilot density is less than 1, the method further comprises:
receiving second indication information, wherein the second indication information indicates a physical resource block to which a downlink reference signal is mapped.

4. The method according to claim 1, wherein a piece of delay information comprises:
a value of a delay;
a magnitude relationship between a value of a delay and a predetermined value; or
a magnitude relationship between a value of a delay and a value of a reference delay.

5. The method according to claim 1, wherein transmit ports corresponding to a same configuration belong to a same transmit port group, and wherein one transmit port group comprises one or more transmit ports.

6. The method according to claim 3, further comprising:
determining, based on the second indication information, a physical resource block configured to carry a reference signal; and
receiving the reference signal on the physical resource block.

7. A communication apparatus, comprising:
at least one processor; and
one or more memories coupled to the at least one processor and storing program instructions for execution by the at least one processor to:
receive, by using a transceiver, first indication information from a network device, wherein the first indication information indicates configurations corresponding to a plurality of transmit ports, wherein each of the plurality of transmit ports is associated with one piece of delay information, wherein transmit ports associated with same delay information correspond to a same configuration, wherein at least two transmit ports associated with different delay information correspond to different configurations based on a correlation between the delay information of the transmit ports and the configurations indicated by the first indication information, and wherein each of the configurations indicated by the first indication information comprises at least one of the following: a precoding resource bundling granularity, a subband size, or a pilot density;
receive, by using the transceiver and based on the configurations indicated by the first indication information, downlink reference signals sent by the plurality of transmit ports; and
perform channel estimation.

8. The communication apparatus according to claim 7, wherein that at least two transmit ports associated with different delay information correspond to different configurations based on a correlation between the delay information of the transmit ports and the configurations indicated by the first indication information comprises:
  when each of the configurations indicated by the first indication information is the precoding resource bundling granularity, a transmit port with a larger delay value corresponds to a smaller precoding resource bundling granularity;
  when each of the configurations indicated by the first indication information is the subband size, a transmit port with a larger delay value corresponds to a smaller subband size; or
  when each of the configurations indicated by the first indication information is the pilot density, a transmit port with a larger delay value corresponds to a larger pilot density.

9. The communication apparatus according to claim 8, wherein when each of the configurations indicated by the first indication information is the pilot density and when the pilot density is less than 1, the one or more memories store the program instructions for execution by the at least one processor to:
  receive, by using the transceiver, second indication information, wherein the second indication information indicates a physical resource block to which a downlink reference signal is mapped.

10. The communication apparatus according to claim 7, wherein a piece of delay information comprises:
  a value of a delay;
  a magnitude relationship between a value of a delay and a predetermined value; or
  a magnitude relationship between a value of a delay and a value of a reference delay.

11. The communication apparatus according to claim 7, wherein transmit ports corresponding to a same configuration belong to a same transmit port group, and wherein one transmit port group comprises one or more transmit ports.

12. The communication apparatus according to claim 7, wherein the first indication information is carried in at least one of the following:
  a radio resource control (RRC) message;
  a medium access control (MAC)-control element (CE); or
  downlink control information (DCI).

13. The communication apparatus according to claim 9, wherein the one or more memories store the program instructions for execution by the at least one processor to:
  determine, based on the second indication information, a physical resource block configured to carry a reference signal; and
  receive the reference signal on the physical resource block.

14. A communication apparatus, comprising:
  at least one processor; and
  one or more memories coupled to the at least one processor and storing program instructions for execution by the at least one processor to:
    generate first indication information, wherein the first indication information indicates configurations corresponding to a plurality of transmit ports, wherein each of the plurality of transmit ports is associated with one piece of delay information, wherein transmit ports associated with same delay information correspond to a same configuration, wherein at least two transmit ports associated with different delay information correspond to different configurations based on a correlation between the delay information of the transmit ports and the configurations indicated by the first indication information, and wherein each of the configurations indicated by the first indication information comprises at least one of the following: a precoding resource bundling granularity, a subband size, or a pilot density; and
    send, by using a transceiver, the first indication information to a terminal device.

15. The communication apparatus according to claim 14, wherein that at least two transmit ports associated with different delay information correspond to different configurations based on a correlation between the delay information of the transmit ports and the configurations indicated by the first indication information comprises:
  when each of the configurations indicated by the first indication information is the precoding resource bundling granularity, a transmit port with a larger d wheelay value corresponds to a smaller precoding resource bundling granularity;
  when each of the configurations indicated by the first indication information is the subband size, a transmit port with a larger delay value corresponds to a smaller subband size; or
  when each of the configurations indicated by the first indication information is the pilot density, a transmit port with a larger delay value corresponds to a larger pilot density.

16. The communication apparatus according to claim 15, wherein when each of the configurations indicated by the first indication information is the pilot density and when the pilot density is less than 1, the one or more memories store the program instructions for execution by the at least one processor to:
  send, by using the transceiver, second indication information, wherein the second indication information indicates a physical resource block to which a downlink reference signal is mapped.

17. The communication apparatus according to claim 14, wherein a piece of delay information comprises:
  a value of a delay;
  a magnitude relationship between a value of a delay and a predetermined value; or
  a magnitude relationship between a value of a delay and a value of a reference delay.

18. The communication apparatus according to claim 14, wherein transmit ports corresponding to a same configuration belong to a same transmit port group, and wherein one transmit port group comprises one or more transmit ports.

19. The communication apparatus according to claim 14, wherein the first indication information is carried in at least one of the following:
  a radio resource control (RRC) message;
  a medium access control (MAC)-control element (CE); or
  downlink control information (DCI).

20. The communication apparatus according to claim 14, wherein the one or more memories store the program instructions for execution by the at least one processor to:
  configure different configurations for different transmit ports based on different delay information.

* * * * *

UNITED STATES PATENT AND TRADEMARK OFFICE
CERTIFICATE OF CORRECTION

PATENT NO. : 12,316,577 B2
APPLICATION NO. : 17/730905
DATED : May 27, 2025
INVENTOR(S) : Yong Liu et al.

Page 1 of 1

It is certified that error appears in the above-identified patent and that said Letters Patent is hereby corrected as shown below:

In the Claims

In Column 58, In Line 20-21, In Claim 15, delete "d wheelay" and insert -- delay --.

Signed and Sealed this
Sixteenth Day of September, 2025

Coke Morgan Stewart
*Acting Director of the United States Patent and Trademark Office*